United States Patent
Ojala et al.

(10) Patent No.: US 12,313,465 B2
(45) Date of Patent: May 27, 2025

(54) HYPERSPECTRAL IMAGING DEVICE

(71) Applicant: TEKNOLOGIAN TUTKIMUSKESKUS VTT OY, Espoo (FI)

(72) Inventors: Kai Ojala, Espoo (FI); Heikki Saari, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 79 days.

(21) Appl. No.: 17/996,859

(22) PCT Filed: Apr. 21, 2021

(86) PCT No.: PCT/FI2021/050301
§ 371 (c)(1),
(2) Date: Oct. 21, 2022

(87) PCT Pub. No.: WO2021/214393
PCT Pub. Date: Oct. 28, 2021

(65) Prior Publication Data
US 2023/0145952 A1    May 11, 2023

(30) Foreign Application Priority Data
Apr. 22, 2020    (FI) .................................. 202054050

(51) Int. Cl.
*G01J 3/26*    (2006.01)
*G01J 3/02*    (2006.01)
(Continued)

(52) U.S. Cl.
CPC .............. *G01J 3/26* (2013.01); *G01J 3/0208* (2013.01); *G01J 3/0218* (2013.01);
(Continued)

(58) Field of Classification Search
CPC ............ G01J 3/2823; G01J 2003/2826; G01J 3/0208; G01J 3/36; G01J 2003/2806; G01J 3/26; G01J 5/0802
See application file for complete search history.

(56) References Cited

U.S. PATENT DOCUMENTS 8,259,212 B2 *   9/2012   Brady .................... H04N 23/55
                                                        348/340
9,652,827 B2 *   5/2017   Mendlovic ........... H04N 23/843
(Continued)

FOREIGN PATENT DOCUMENTS

GB        2136146 A      9/1984
JP   H06-1994-129908 A   5/1994
(Continued)

OTHER PUBLICATIONS

International Conference on Space Optics—ICSO 2018, Chania Greece—NanoCarb part 1: compact snapshot imaging interferometer for CO2 monitoring from space (9 pages).
(Continued)

*Primary Examiner* — Tarifur R Chowdhury
*Assistant Examiner* — Roberto Fabian, Jr.
(74) *Attorney, Agent, or Firm* — Thomas|Horstemeyer, LLP

(57) ABSTRACT

A spectral imaging device comprises:
an optical modifier system (SYS1) to form axial light beams (LB2) from received light beams (LB1), the axial light beams (LB2) being parallel with an optical axis (AX1) of the imaging device (500),
a Fabry-Perot interferometer (FPI) to provide filtered axial light beams (LB3) by filtering light of the axial light beams (LB2),
an image sensor (SEN1), and
(Continued)

an array (ARR1) of lenses ($LNS_{0,0}$, $LNS_{0,1}$) to form a plurality of sub-images ($S_{0,0}$, $S_{0,1}$) on the image sensor (SEN1) by focusing light of the filtered light beams (LB3).

11 Claims, 19 Drawing Sheets

(51) Int. Cl.
 *G01J 3/28* (2006.01)
 *G02B 13/22* (2006.01)

(52) U.S. Cl.
 CPC ....... *G01J 3/2823* (2013.01); *G01J 2003/283* (2013.01); *G02B 13/22* (2013.01)

(56) References Cited

U.S. PATENT DOCUMENTS

| | | | | |
|---|---|---|---|---|
| 2013/0092819 | A1* | 4/2013 | Hall | G02B 27/126 250/208.1 |
| 2015/0281535 | A1* | 10/2015 | Korenaga | G01N 33/025 348/360 |
| 2017/0316547 | A1 | 11/2017 | Mendlovic et al. | |
| 2019/0003984 | A1* | 1/2019 | Kester | G01J 5/0066 |
| 2019/0335099 | A1 | 10/2019 | Zhang et al. | |
| 2020/0074592 | A1 | 3/2020 | Vollmerhausen | |

FOREIGN PATENT DOCUMENTS

| | | | |
|---|---|---|---|
| JP | 2000162043 | A * | 6/2000 |
| JP | 2013170867 | A | 9/2013 |
| JP | 2015-200640 | A | 11/2015 |
| WO | 2010/078563 | A1 | 7/2010 |
| WO | 2014/207742 | A2 | 12/2014 |

OTHER PUBLICATIONS

Le Coarer, E., et al., PYTHEAS: A multi-channel Fabry Perot spectrometer for astronomical imaging, Astronomy & Astrophysics Supplement Series, vol. 111 (1995), pp. 359-368.

International Search Report and Written Opinion of the International Searching Authority, PCT/FI2021/050301, mailed Jul. 26, 2021.

\* cited by examiner

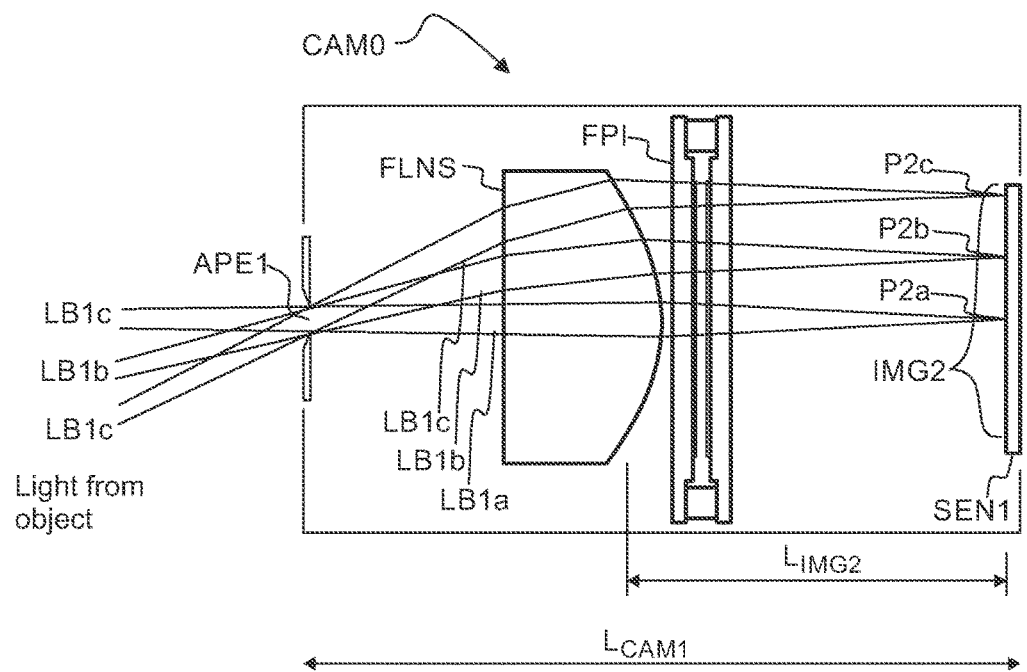
Comparative Example  Fig. 1
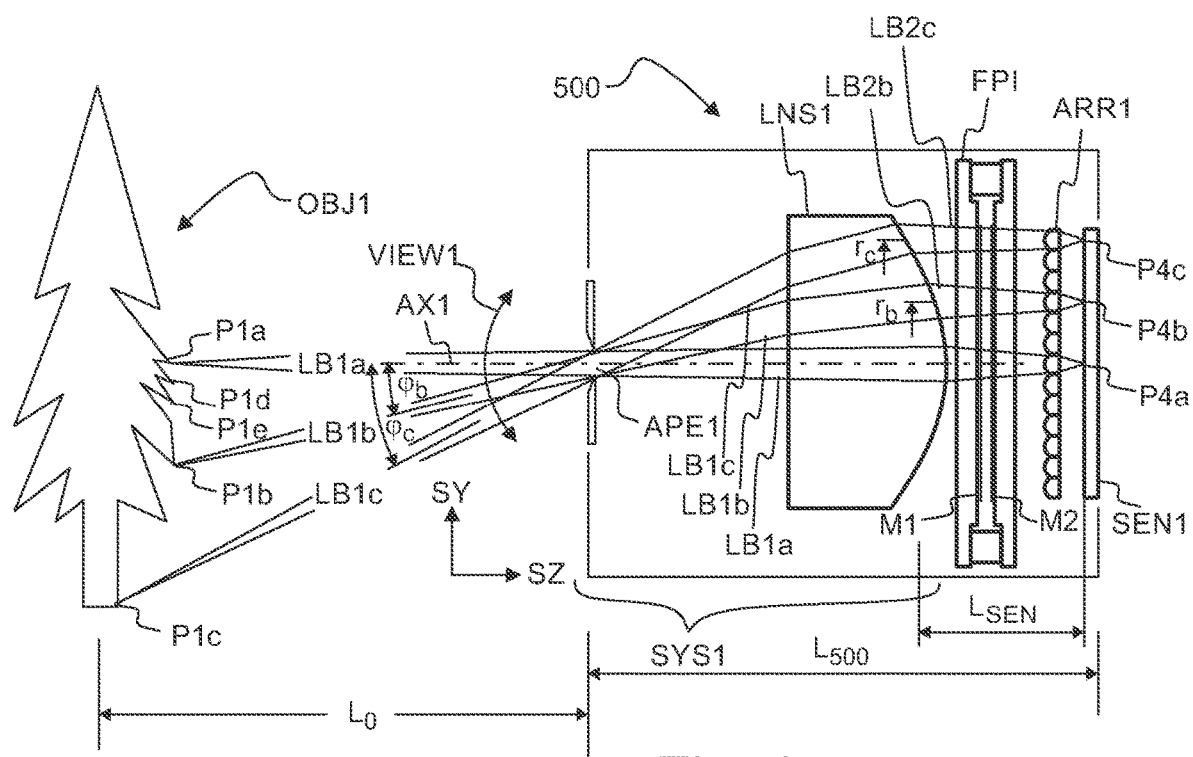
Fig. 2

HYPERSPECTRAL IMAGING DEVICE

CROSS-REFERENCE TO RELATED APPLICATIONS

This application is the 35 U.S.C. § 371 national stage application of PCT Application No. PCT/FI2021/050301, filed Apr. 21, 2021, where the PCT claims priority to, and the benefit of, FINNISH application no. 20205405, filed Apr. 22, 2020, both of which are herein incorporated by reference in their entireties.

FIELD

The present invention relates to spectral imaging devices.

BACKGROUND

Referring to the comparative example shown in FIG. 1, a spectral camera CAM1 may comprise a focusing lens FLNS, a Fabry-Perot interferometer FPI, and an image sensor SEN1. The Fabry-Perot interferometer FPI may operate as an adjustable optical passband filter. The lens FLNS may form an image IMG2 of an object on the image sensor SEN1, by focusing light LB1 received from the object to the image sensor SEN1 through the Fabry-Perot interferometer FPI.

The focusing distance $L_{IMG2}$ between the lens FLNS and the image sensor SEN1 may represent a significant proportion of the total length $L_{CAM1}$ of the spectral camera CAM1. The focusing distance $L_{IMG2}$ may cause e.g. that the size of the camera CAM1 is too large for mobile applications. An attempt to reduce the focusing distance $L_{IMG2}$ may increase the divergence of light beams transmitted through the Fabry-Perot interferometer FPI, which in turn may have an adverse effect on the spectral resolution of the Fabry-Perot interferometer FPI.

SUMMARY

An object is to provide a spectral imaging device. An object is to provide a method for spectral imaging. An object is to provide an imaging spectrometer.

According to an aspect, there is provided a device of claim 1.

Further aspects are defined in the other claims.

The scope of protection sought for various embodiments of the invention is set out by the independent claims. The embodiments, if any, described in this specification that do not fall under the scope of the independent claims are to be interpreted as examples useful for understanding various embodiments of the invention.

Optical micro-structures may be utilized to provide a compact size of the imaging device. In particular, the imaging device may comprise a micro lens array to reduce the length of the imaging device. The imaging device may comprise the micro lens array to provide compact size.

The imaging device may be used for multispectral imaging. The Fabry-Perot interferometer may operate as a tunable band-pass filter of the imaging device. The imaging device may simultaneously capture all input fields of a viewing sector at a single wavelength. The spectral position of the passband of the Fabry-Perot interferometer may be scanned to obtain spectral narrowband images of an object at several different wavelengths. The imaging device may scan the optical input spectrally to generate band-pass image data set of a scenery to an image sensor.

The imaging device may be arranged to operate such that the divergence of light transmitted through the Fabry-Perot interferometer is smaller than a predetermined limit. Light received from each field angle of the viewing sector may simultaneously pass through the Fabry-Perot interferometer, so as to provide a spectral image of an object. A single spectral image may represent a narrow spectral band of the total spectrum of the object. Several spectral images may be combined to provide a multi-wavelength spectral image, if desired.

Using the micro lens array may allow substantially reduction of the size of the imaging device. The length of the imaging device may be e.g. in the range of 3 mm to 15 mm.

In an embodiment, the imaging device may comprise a telecentric system to form axial light beams from light beams received from different field angles of the viewing sector.

In an embodiment, the imaging device may comprise an afocal system to reduce the length of the imaging device. The afocal system may comprise a combination of a negative lens and a limiter unit. The limiter unit may prevent propagation of light rays which are outside an acceptance cone.

In an embodiment, the imaging device may comprise a combination of a modulator array and a filter array e.g. in order to enable using one of the several transmittance peaks of the Fabry-Perot interferometer. The modulator array may comprise e.g. a plurality of first modulable regions and a plurality of second modulable regions. The transmittance of the modulable regions may be changed e.g. by an external control signal. The filter array may comprise e.g. a plurality of first optical spectral filter regions, and a plurality of second optical spectral filter regions. The spectral transmittance of the first filter regions may be different from the spectral transmittance of the second filter regions. The transverse positions of the first modulable regions may match the transverse positions of the first filter regions. A first transmittance peak of the interferometer may be at a first wavelength, and a second transmittance peak of the interferometer may be at a second wavelength. The modulator array may be first controlled to allow light at the first wavelength to propagate to the image sensor, wherein the modulator array may prevent propagation of light at the second wavelength. Next, the modulator array may be controlled to allow light at the second wavelength to propagate to the image sensor, wherein the modulator array may prevent propagation of light at the first wavelength.

The imaging device may be used e.g. for hyperspectral imaging. The imaging device may also be called e.g. as a hyperspectral camera device.

The imaging device may be e.g. a portable device. The imaging device may be e.g. a wearable device. The imaging device may be a pocketable device (i.e. may be easily carried in a pocket). The imaging device may be implemented e.g. in a smartphone. The imaging device may be implemented e.g. in a vehicle. The imaging device may be implemented e.g. in an unmanned aerial vehicle (drone).

The imaging device may be easily integrated as a part of an optical apparatus. The imaging device may be implemented e.g. in an industrial measuring device.

BRIEF DESCRIPTION OF THE DRAWINGS

In the following examples, several variations will be described in more detail with reference to the appended drawings, in which FIG. 1 shows, by way of example, in a cross-sectional side view, a comparative example of a device, which comprises a Fabry-Perot interferometer, FIG. 2 shows, by way of example, in a cross-sectional side view, an imaging device, which comprises a Fabry-Perot interferometer, and a microlens array.

DETAILED DESCRIPTION

Referring to FIG. 2, the imaging device 500 may comprise a light beam modifier system SYS1, a Fabry-Perot interferometer FPI, a microlens array ARR1, and an image sensor SEN1.

Figure 10A:
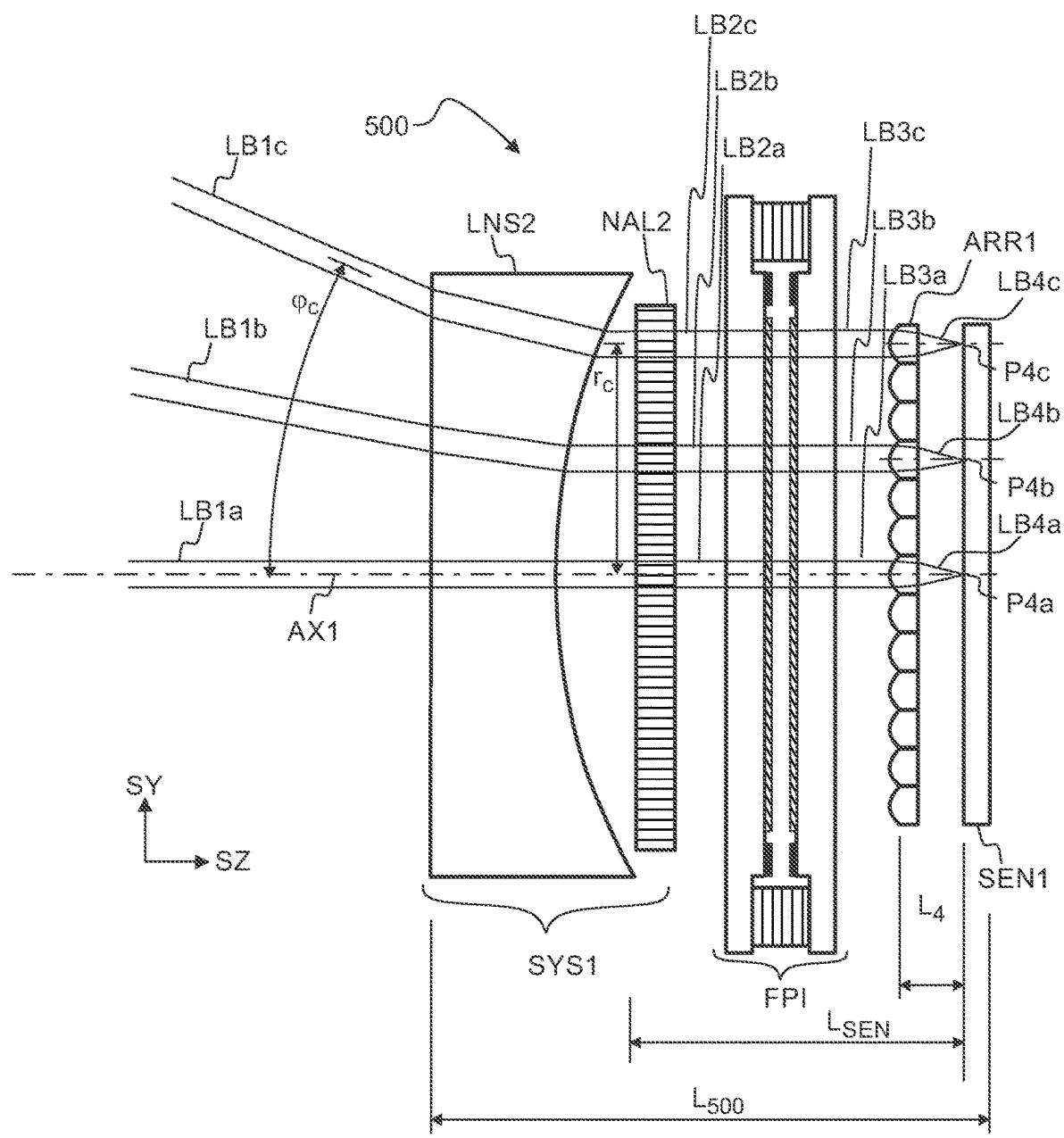
FIG. 10a shows, by way of example, in a cross-sectional side view, an imaging device which comprises an afocal system.

The light beam modifier system SYS1 may form axial light beams LB2 from received light beams LB1 such that the radial position (r) of each formed axial beam LB2 is substantially proportional to the field angle ($\varphi$) of the corresponding received beam. The modifier system SYS1 may be e.g. a telecentric system or an afocal system (FIG. 10a).

The imaging device 500 may receive light LB1 from an object OBJ1. The imaging device 500 may be arranged to form a spectral image of the object OBJ1 by filtering the light LB1 with the Fabry-Perot interferometer FPI. The object OBJ1 may be located in the viewing sector VIEW1 of the device 500. Spectral images may be formed at several different wavelengths, and the spectral images of the different wavelengths may subsequently be combined to form multi-wavelength spectral image (CIMG) of the object OBJ1, if desired.

The object OBJ1 may reflect, emit and/or transmit light LB1, which may be received to the imaging device 500. The device 500 may be used e.g. for measuring reflection, transmission (absorption) and/or emission of the light LB1 of the object OBJ1.

The object OBJ1 may comprise a plurality of object points P1a, P1b, P1c, P1d, P1e. The imaging device 500 may receive light LB1a from the point P1a, light LB1b from the point P1b, and light LB1c from the point P1c, respectively.

The imaging device 500 may have an optical axis AX1. The modifier system SYS1 may form an axial light beam from a received light beam such that the angular orientation ($\alpha,\varphi$) of the received light beam is mapped into a transverse position ($\alpha,r$) of the centerline of said axial light beam. For example, a field angle $\varphi_b$ of the light beam LB1b may be mapped into a radial position $r_b$ of the centerline of the axial beam LB2b. For example, a field angle $\varphi_c$ of the light beam LB1c may be mapped into a radial position $r_c$ of the centerline of the axial beam LB2c. The modifier system SYS1 may also be called e.g. as an optical mapping system SYS1. The modifier system may convert light of inclined beams into axial beams. The modifier system SYS1 may also be called e.g. as a conversion system SYS1.

Figure 10B:
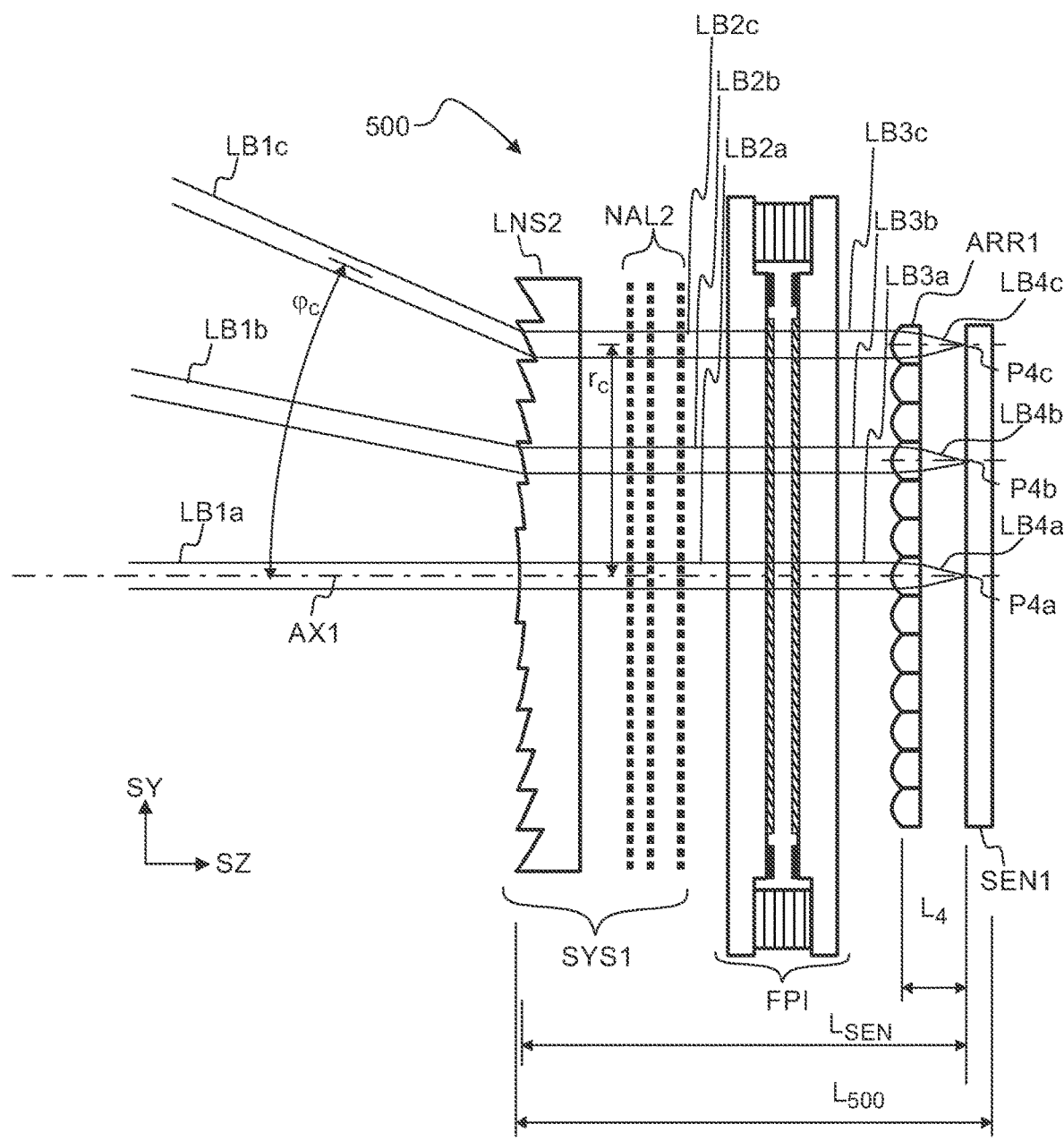
FIG. 10b shows, by way of example, in a cross-sectional side view, an imaging device, which comprises a Fresnel lens.

Each axial beam may be substantially parallel with the optical axis AX1 of the device 500. Each light beam (LB1a, LB1b, LB1c) received from an object point may correspond to an axial beam, which has a different transverse position ($\alpha,r$). The transverse position of each axial beam may be specified e.g. by an angle $\alpha$ and a radial distance r. The transverse position ($\alpha,r$) of each axial beam may be a function of the angular orientation ($\alpha,\varphi$) of the corresponding received light beam LB1. The modifier system SYS1 may comprise e.g. a telecentric system. The modifier system SYS1 may comprise e.g. a combination of a negative lens and a limiter unit (FIG. 10a). The limiter unit may be arranged to block light rays which are outside a predetermined acceptance cone (FIG. 10b). The negative lens means a lens which has a negative focal length.

The imaging device 500 may from an image point P4a by modifying, filtering and focusing the light LB1a received from the object point P1a. The imaging device 500 may from an image point P4b by modifying, filtering and focusing the light LB1b received from the object point P1b. The imaging device 500 may from an image point P4c by modifying, filtering and focusing the light LB1c received from the object point P1c.

Figure 5A:
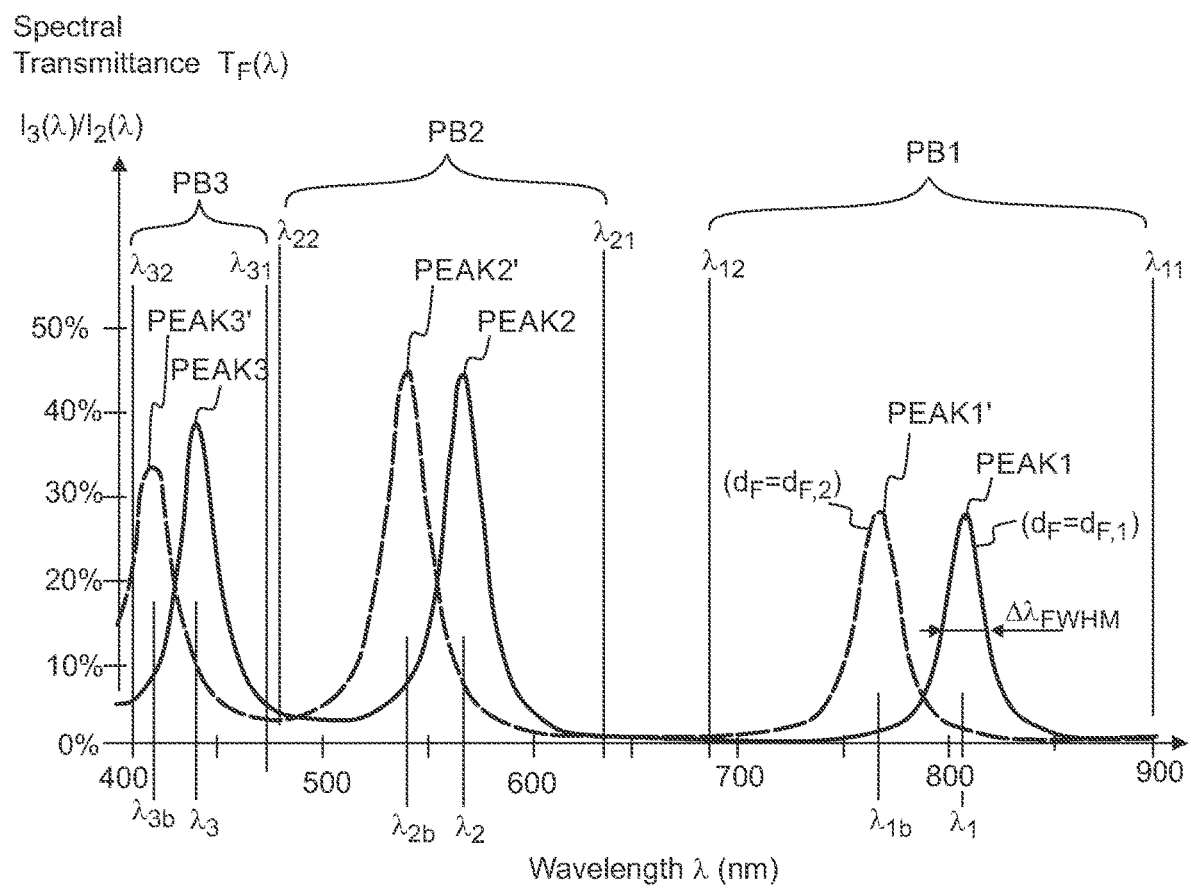
FIG. 5a shows, by way of example, spectral transmittance peaks of the Fabry-Perot interferometer.

The Fabry-Perot interferometer FPI comprises a pair of semi-transparent mirrors M1, M2, which are arranged to operate as an optical cavity. The spectral position of the transmittance peak (PEAK1) of the Fabry-Perot interferometer FPI may be changed by changing the distance ($d_F$) between the mirrors M1, M2 (FIG. 5a).

SX, SY and SZ may denote orthogonal directions. The direction SZ may be parallel with the optical axis AX1 of the device 500. The mirrors M1, M2 of the Fabry-Perot interferometer may be perpendicular to the optical axis AX1. The mirrors M1, M2 of the Fabry-Perot interferometer may be parallel with a plane defined by the directions SX and SY.

$L_0$ may denote a distance between the object OBJ1 and the device 500. $L_{500}$ may denote the external length of the device 500 in the direction of the axis AX1. $L_{SEN}$ may denote a distance between a principal plane of the modifier system SYS1 and the image sensor SEN1.

Using the microlens array ARR1 together with the modifier system SYS1 may allow reducing the distance $L_{SEN}$. Reducing the distance $L_{SEN}$ may allow reducing the total length $L_{500}$ of the imaging device 500.

Figure 3A:
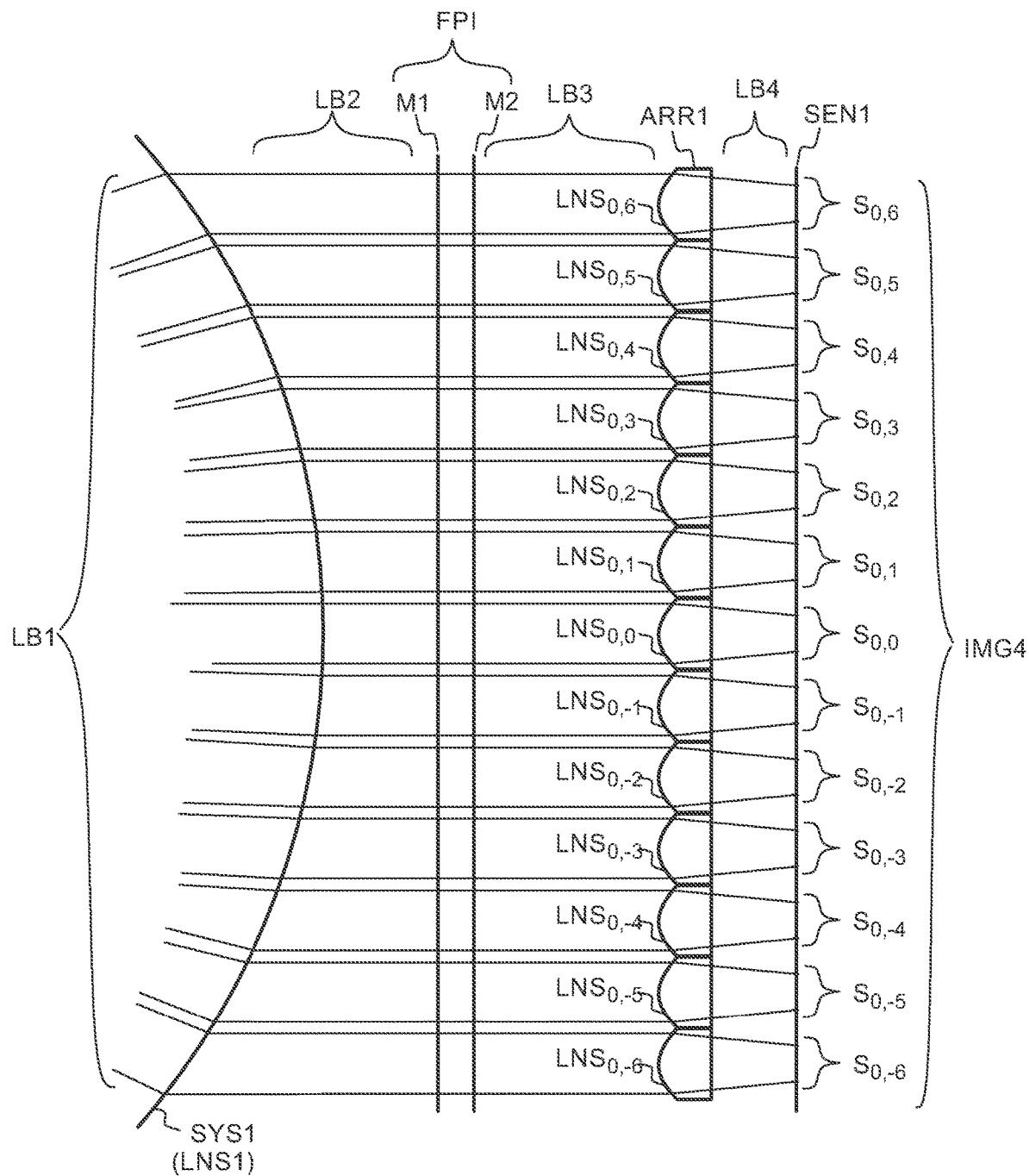
FIG. 3a shows, by way of example, in a cross-sectional side view, forming a plurality of sub-images by using the microlens array.

Referring to FIG. 3a, the modifier system SYS1 may form axial light LB2 from light LB1 received from the viewing sector VIEW1 of the imaging device 500. The interferometer FPI may form transmitted light LB3 from the axial light LB2. The lens array ARR1 may form focused light LB4 by focusing light of the transmitted light LB3. The focused light LB4 may impinge on the image sensor SEN1 in order to form an optical image IMG4 on the image sensor SEN1. The lens array ARR1 may form the optical image IMG4 on the image sensor SEN1 by focusing light of the transmitted light LB3.

The lens array ARR1 may form a plurality of spatially separate optical sub-images $S_{-6,-6}$ ..., $S_{0,0}$, ... $S_{6,6}$. The optical image IMG4 may consist of a plurality of spatially separate sub-images $S_{-6,-6}$ ..., $S_{0,0}$, ... $S_{6,6}$. The sub-images may also be called e.g. as partial images.

The light LB3 for forming the plurality of sub-images may be transmitted simultaneously through the mirrors M1, M2 of the interferometer FPI. The light LB3 for forming the plurality of sub-images may be transmitted through the same single interferometer FPI.

The image sensor SEN1 may capture the sub-images $S_{-6,-6}$ ..., $S_{0,0}$, ... $S_{6,6}$. The image sensor SEN1 covert the optical sub-images $S_{-6,-6}$ ..., $S_{0,0}$, ... $S_{6,6}$ into digital form. The image sensor SEN1 may provide image data of the sub-images $S_{-6,-6}$ ..., $S_{0,0}$, ... $S_{6,6}$ to one or more data processors.

The sub-images $S_{-6,-6}$ ..., $S_{0,0}$, ... $S_{6,6}$ may be stitched together to form a single continuous image (IMG$\lambda$1) of the object OBJ1. The device 500 may comprise a data processor (CNT1) for performing stitching. The stitching may also be performed e.g. in an internet server.

In an embodiment, the stitching may be carried out as a device-specific image processing operation, without a need to analyze the captured sub-images to find image points corresponding to common object points.

Figure 3B:
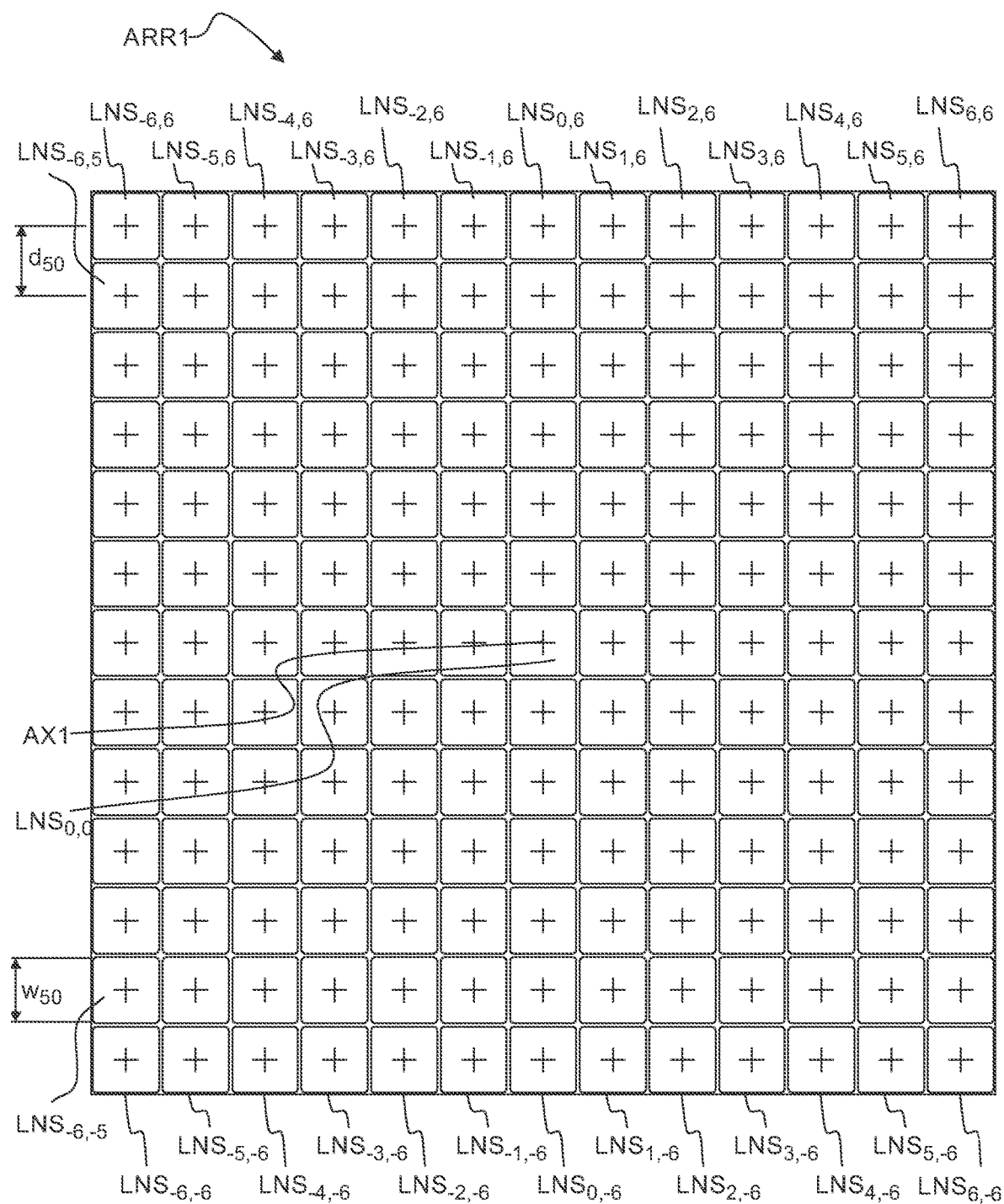
FIG. 3b shows, by way of example, in an axial view, the microlens array.

Referring to FIG. 3b, the lens array ARR1 may comprise an array of lenses $LNS_{-6,-6}$, ... $LNS_{0,0}$, ... $LNS_{6,6}$. The lenses may be arranged e.g. in a rectangular array, which may comprise e.g. M columns and N rows. The lenses may also be arranged e.g. in a staggered array and/or in a hexagonal array. The lens array ARR1 may be formed e.g. by molding, etching or joining lenses together. The lenses may be e.g. spherical or aspherical lenses. The lenses may also be e.g. GRIN lenses (GRIN means gradient index). The lenses may also be Fresnel lenses or diffractive lenses. $d_{50}$ may denote a distance between centers of adjacent lenses. The dimension $d_{50}$ may also be called e.g. as the pitch of the lens array ARR1. $w_{50}$ may denote a transverse dimension of clear aperture of a single lens.

Figure 3C:
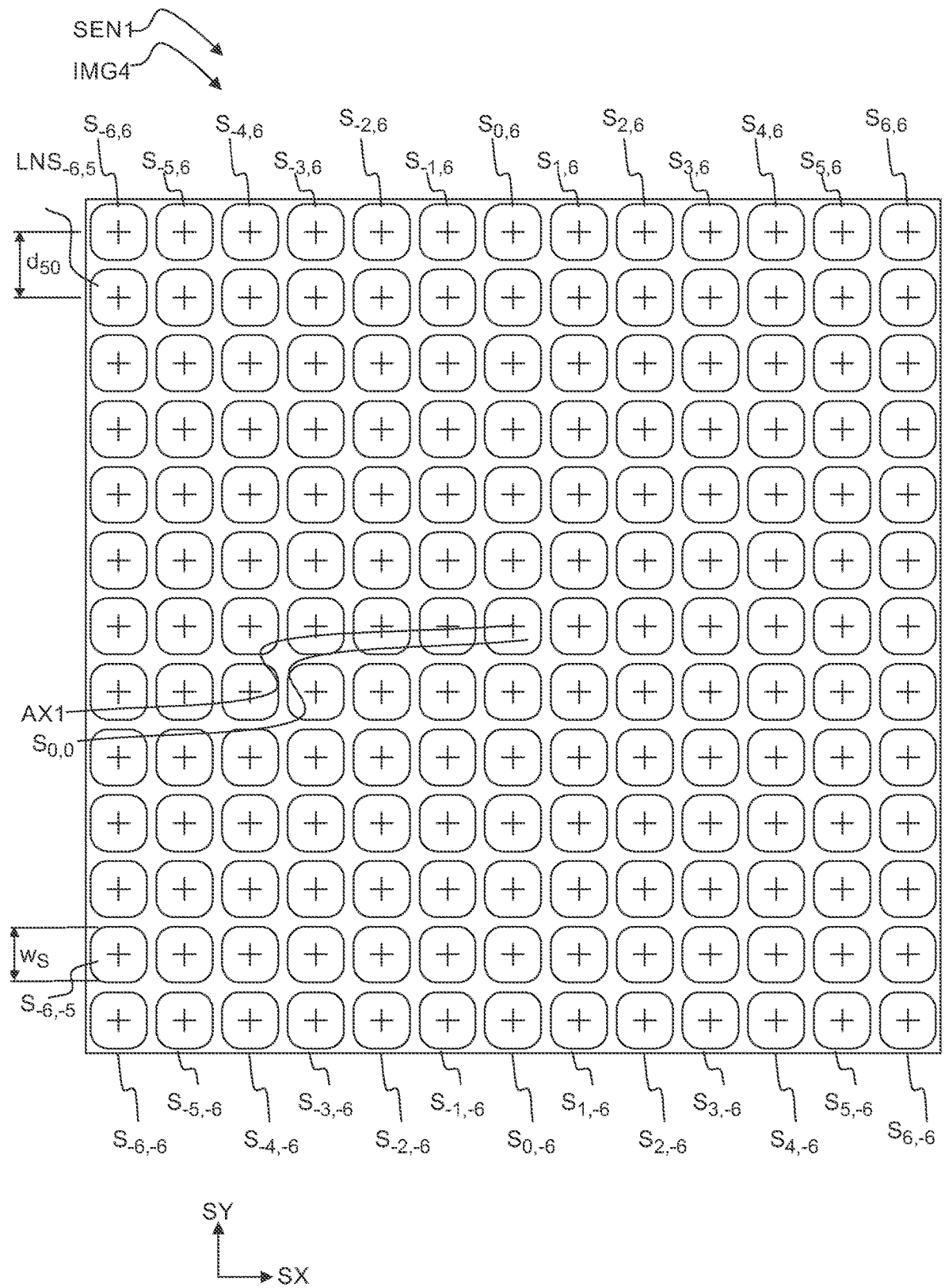
FIG. 3c shows, by way of example, in an axial view, a plurality of sub-images formed by using the microlens array.

Referring to FIG. 3c, the image IMG4 formed on the image sensor SEN1 may comprise the plurality of spatially separate sub-images $S_{-6,-6}$ ..., $S_{0,0}$, ... $S_{6,6}$. The transverse positions of the sub-images may match the transverse positions of the lenses of the array ARR1. The center of each sub-image may coincide with the center of the corresponding microlens.

Figure 4A:
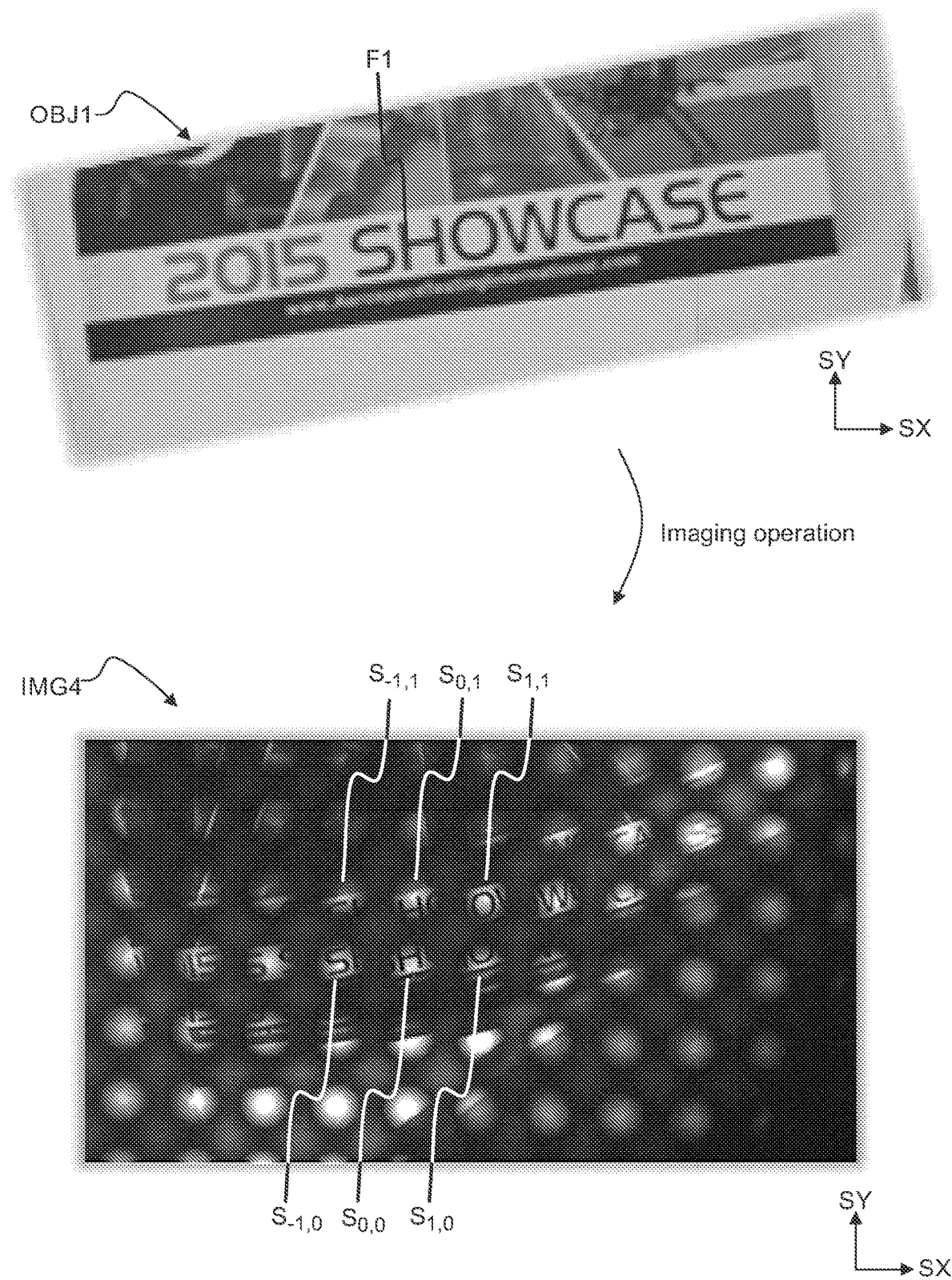
FIG. 4a shows, by way of example, forming a plurality of sub-images from light received from an object.
Figure 4B:
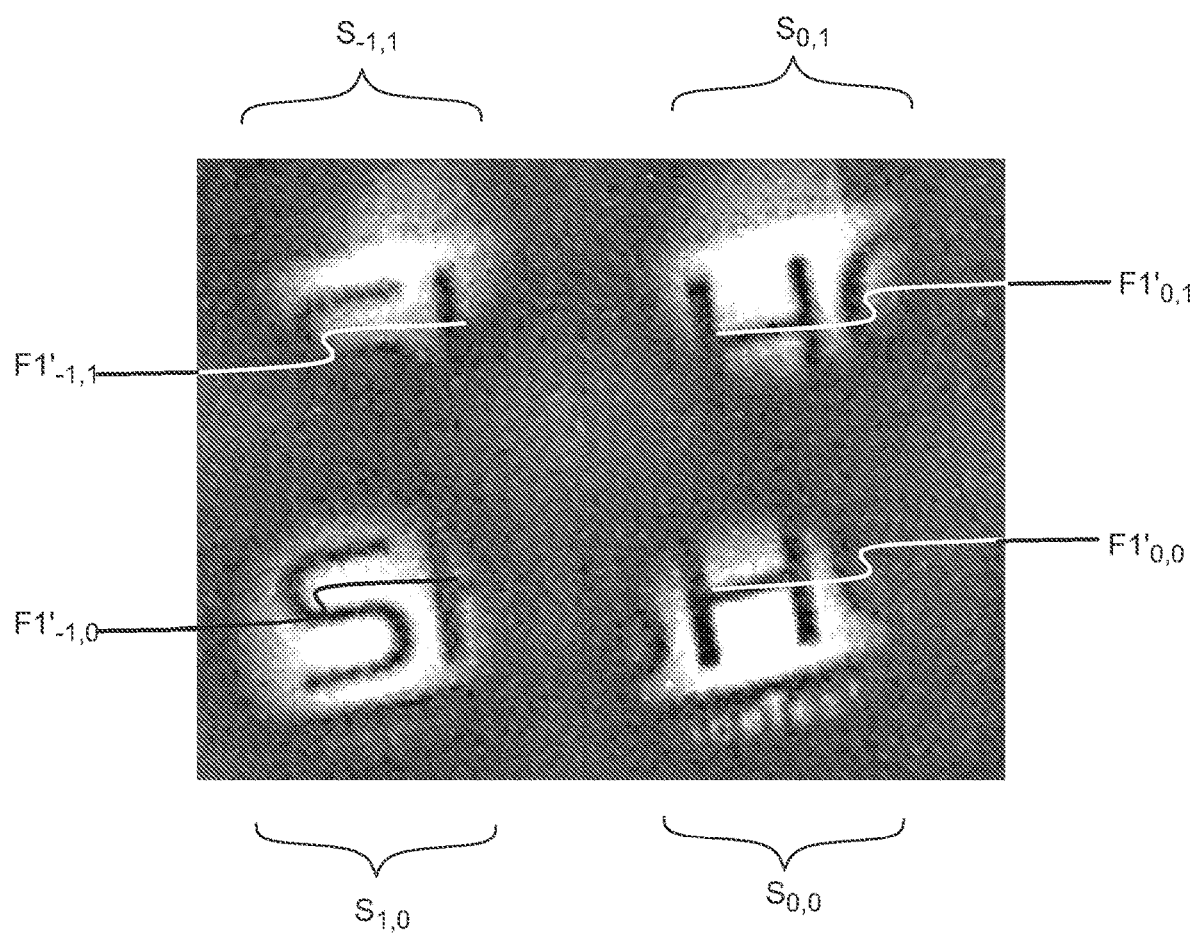
FIG. 4b shows, by way of example, in an axial view, a plurality of sub-images formed by using the microlens array.

Referring to FIGS. 4a and 4b, the sub-images $S_{-1,0}$, ... $S_{1,1}$ may be partial images of the object OBJ1. (The object OBJ1 may be e.g. a printed paper).

Referring to FIG. 4b, a first sub-image $S_{0,0}$ may comprise a first image $F1'_{0,0}$ of a feature F1 of the object OBJ1, and a second adjacent sub-image $S_{0,1}$ may comprise a second image $F1'_{0,1}$ of the same feature F1 of the object OBJ1. The feature F1 may be e.g. the point where the horizontal line of the character "H" meets the vertical line of the character "H". The adjacent sub-images $S_{0,0}$, $S_{0,1}$ may comprise images $F1'_{0,0}$, $F1'_{0,1}$ of the same feature F1 of the object OBJ1, so as to allow forming a continuous spectral image IMG$\lambda$1 by stitching the sub-images $S_{0,0}$, $S_{0,1}$.

In particular, four or more adjacent sub-images ($S_{0,0}$, $S_{0,1}$, $S_{-1,0}$, $S_{-1,1}$) may comprise images F1' of the same object point, so as to allow forming a continuous larger image by stitching. For example, the vertical neighbor $S_{0,1}$ of the first sub-image $S_{0,0}$ may comprise the second image $F1'_{0,1}$ of the feature F1. A horizontal neighbor $S_{-1,0}$ of the first sub-image $S_{0,0}$ may comprise a third image $F1'_{-1,0}$ of the feature F1. A diagonal neighbor $S_{-1,1}$ of the first sub-image $S_{0,0}$ may comprise a fourth image $F1'_{-1,0}$ of the feature F1.

A spectral transmittance peak (PEAK1) of the Fabry-Perot interferometer FPI may be adjusted e.g. to a first wavelength $\lambda$1 to capture a first set of sub-images S. The sub-images S of the first set may be stitched together to form a continuous spectral image IMG$\lambda$1 of the object OBJ1.

FIG. 5a shows, by way of example, the spectral transmittance $T_F(\lambda)$ of the Fabry-Perot interferometer FPI. The spectral transmittance $T_F(\lambda)$ may refer to the ratio $I_{LB3}(\lambda)/I_{LB2}(\lambda)$, wherein $I_{LB2}(\lambda)$ may denote the intensity of an axial light beam LB2 impinging on the interferometer FPI, and $I_{LB3}(\lambda)$ may denote the intensity of the corresponding light beam LB3 transmitted through the interferometer FPI.

The spectral width $\Delta\lambda_{FWHM}$ of a transmittance peak PEAK1 may be e.g. in the range of 5 nm to 30 nm. FWHM denotes full width at half maximum.

The spectral transmittance $T_F(\lambda)$ may have one or more adjacent transmittance peaks PEAK1, PEAK2, PEAK3 of the Fabry-Perot interferometer FPI. For example, a first transmittance peak PEAK1 may be at a wavelength $\lambda_1$, a second transmittance peak PEAK2 may be at a wavelength $\lambda_2$, and a third transmittance peak PEAK3 may be at a wavelength $\lambda_3$, in a situation where the mirror distance $d_F$ is equal to a first value $d_{F,1}$. The interferometer FPI may be scanned by changing the mirror distance $d_F$.

The spectral positions $\lambda_1$, $\lambda_2$, $\lambda_3$ of the transmission peaks PEAK1, PEAK2, PEAK3 may depend on the mirror distance $d_F$ according to the Fabry-Perot transmission function. The spectral positions of the transmission peaks may be changed by changing the mirror gap $d_F$. The transmission peaks PEAK1, PEAK2, PEAK3 may also be called passbands of the Fabry-Perot interferometer.

Changing the mirror distance $d_F$ may move the spectral position of the transmittance peaks PEAK1, PEAK2, PEAK3. For example, the first transmittance peak PEAK1' may be at a wavelength $\lambda_{1b}$, a second transmittance peak PEAK2' may be at a wavelength $\lambda_{2b}$, and a third transmittance peak PEAK3' may be at a wavelength $\lambda_{3b}$, in a situation where the mirror distance $d_F$ is equal to a second value $d_{F,2}$.

The device 500 may optionally comprise one or more optical filters (e.g. CFA1, FIL1, FIL2) to limit the spectral response of the device 500. The one or more filters may together provide a spectral transmittance. For example, the one or more filters may allow using a single selected transmittance peak of the Fabry-Perot interferometer (e.g. PEAK1, PEAK2, or PEAK3), by preventing transmission of light at the wavelengths of the other transmittance peaks.

For example, the device 500 may comprise one or more filters (CFA1, FIL1, FIL2) to provide a first band pass region PB1 defined e.g. by cut-off wavelengths $\lambda_{11}$ and $\lambda_{12}$. For example, the device 500 may comprise one or more filters (CFA1, FIL1, FIL2) to provide a second band pass region PB2 defined e.g. by cut-off wavelengths $\lambda_{21}$ and $\lambda_{22}$. For example, the device 500 may comprise one or more filters (CFA1, FIL1, FIL2) to provide a third band pass region PB3 defined e.g. by cut-off wavelengths $\lambda_{31}$ and $\lambda_{32}$.

In an embodiment, the device 500 may comprise a modulator (MOD1) and a filter array (FIL1) to alternately enable transmission of light via a first passband PB1 or via a second passband PB2 (FIG. 14). The first passband PB1 may be defined by cut-off wavelengths $\lambda_{11}$ and $\lambda_{12}$. The second passband PB1 may be defined by cut-off wavelengths $\lambda_{21}$ and $\lambda_{22}$. The filter array may comprise a plurality of first filter regions to provide the first passband PB1, and a plurality of second filter regions to provide the second passband PB2.

Figure 5B:
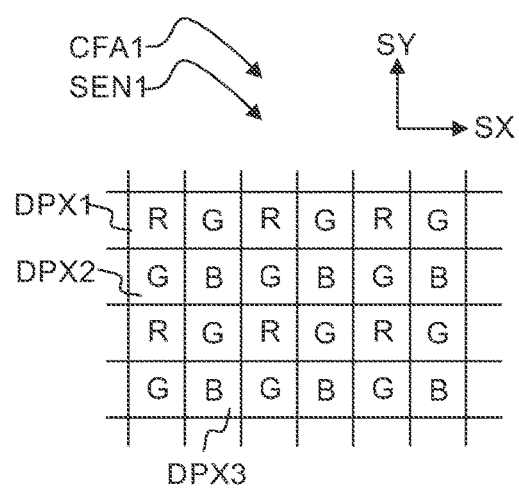
FIG. 5b shows, by way of example, a filter array superposed on an image sensor.

Referring to FIG. 5b, the device 500 may comprise a filter array CFA1, which may be superposed on the image sensor SEN1. The filter array CFA1 may be e.g. an RGB Bayer matrix. The filter array CFA1 may comprise first filter regions (R) to provide a first spectral transmittance. The filter array CFA1 may comprise second filter regions (G) to provide a second spectral transmittance. The filter array CFA1 may comprise third filter regions (B) to provide a third spectral transmittance. The first filter regions (R) may provide e.g. a first spectral sensitivity for first detector pixels DPX1 of the image sensor SEN1. The second filter regions (G) may provide e.g. a second spectral sensitivity for second detector pixels DPX2 of the image sensor SEN1. The third filter regions (G) may provide e.g. a third spectral sensitivity for third detector pixels DPX3 of the image sensor SEN1. For example, the first detector pixels DPX1 may selectively detect light transmitted at the first transmittance peak PEAK1 of the interferometer, wherein the first detector pixels DPX1 may be insensitive to light transmitted at the other transmittance peaks (PEAK2, PEAK3). For example, the second detector pixels DPX2 may selectively detect light transmitted at the second transmittance peak PEAK2. For example, the third detector pixels DPX3 may selectively detect light transmitted at the third transmittance peak PEAK3.

Figure 5C:
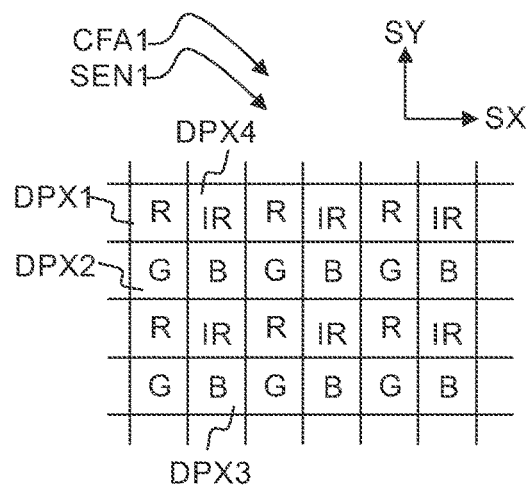
FIG. 5c shows, by way of example, a filter array superposed on an image sensor.
Figure 5D:
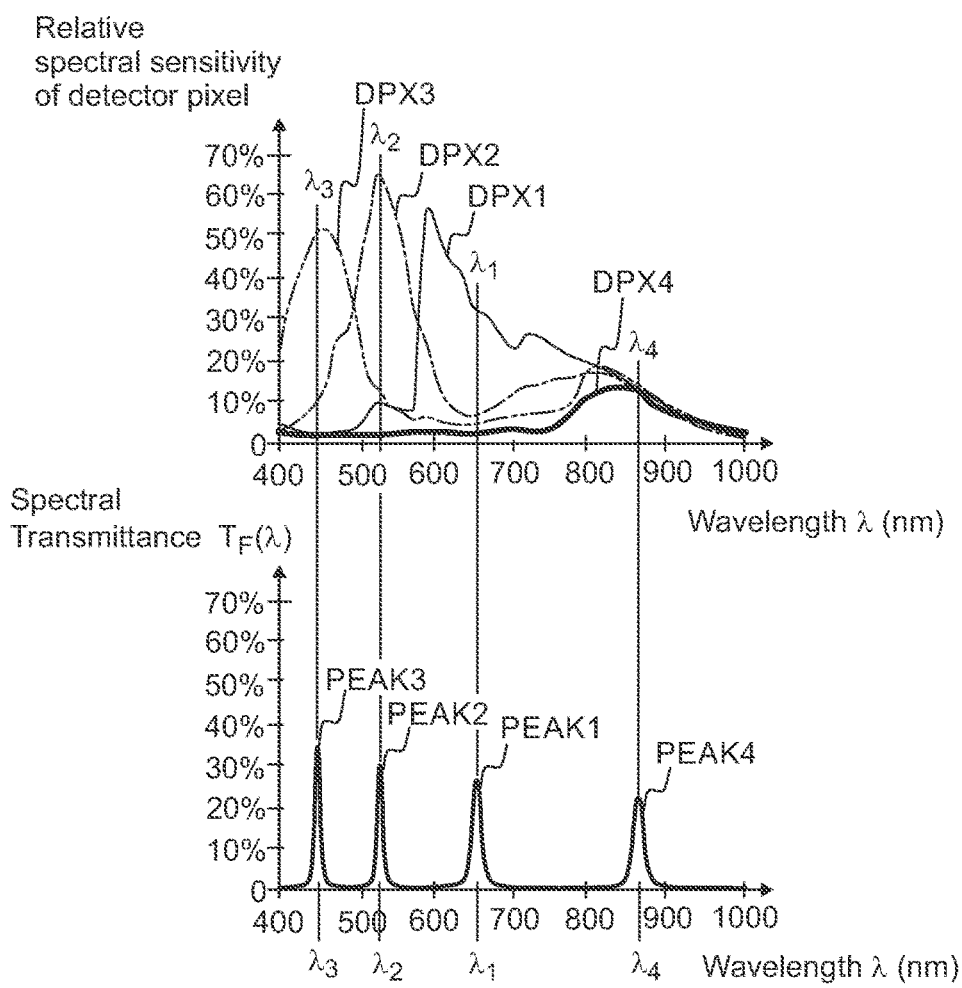
FIG. 5d shows, by way of example, spectral sensitivities of detector pixels of an image sensor, and spectral transmittance peaks of a Fabry-Perot interferometer.

Referring to FIGS. 5c and 5d, the filter array CFA1 may comprise first filter regions (R) to provide a first spectral transmittance, second filter regions (G) to provide second spectral transmittance, third filter regions (B) to provide third spectral transmittance, and fourth filter regions (IR) to provide fourth spectral transmittance.

The first filter regions (R) may provide e.g. a first spectral sensitivity for first detector pixels DPX1 of the image sensor SEN1. The second filter regions (G) may provide e.g. a second spectral sensitivity for second detector pixels DPX2 of the image sensor SEN1. The third filter regions (G) may provide e.g. a third spectral sensitivity for third detector pixels DPX3 of the image sensor SEN1. The fourth filter regions (IR) may provide e.g. a fourth spectral sensitivity for fourth detector pixels DPX4 of the image sensor SEN1.

The first detector pixels DPX1 may detect light e.g. at the wavelength ($\lambda 1$) of the first transmittance peak PEAK1 of the interferometer. The second detector pixels DPX2 may detect light e.g. at the wavelength ($\lambda 2$) of the second transmittance peak PEAK2. The third detector pixels DPX3 may detect light e.g. at the wavelength ($\lambda 3$) of the third transmittance peak PEAK3. The fourth detector pixels DPX4 may detect light e.g. at the wavelength ($\lambda 4$) of the fourth transmittance peak PEAK4.

The first detector pixels DPX1 may spectrally selectively detect e.g. red light (R). The second detector pixels DPX2 may spectrally selectively detect e.g. green light (G). The third detector pixels DPX3 may spectrally selectively detect e.g. blue light (B). The fourth detector pixels DPX4 may spectrally selectively detect e.g. infrared light (IR).

The filter regions (R, G, B, IR) of the filter array CFA1 do not need to reject all spectral components which are outside the primary passband of each filter region. For example, the first filter regions (R) may allow transmission of light at the wavelengths $\lambda 1$ and $\lambda 4$. For example, spectral components of light LB1 at the wavelengths $\lambda 1$, $\lambda 2$, $\lambda 3$, $\lambda 4$ may be determined from the detected signals of the detector pixels (DPX1, DPX2, DPX3, DPX4) and from the known spectral sensitivity functions of the detector pixels, by solving a system of equations.

Figure 6:
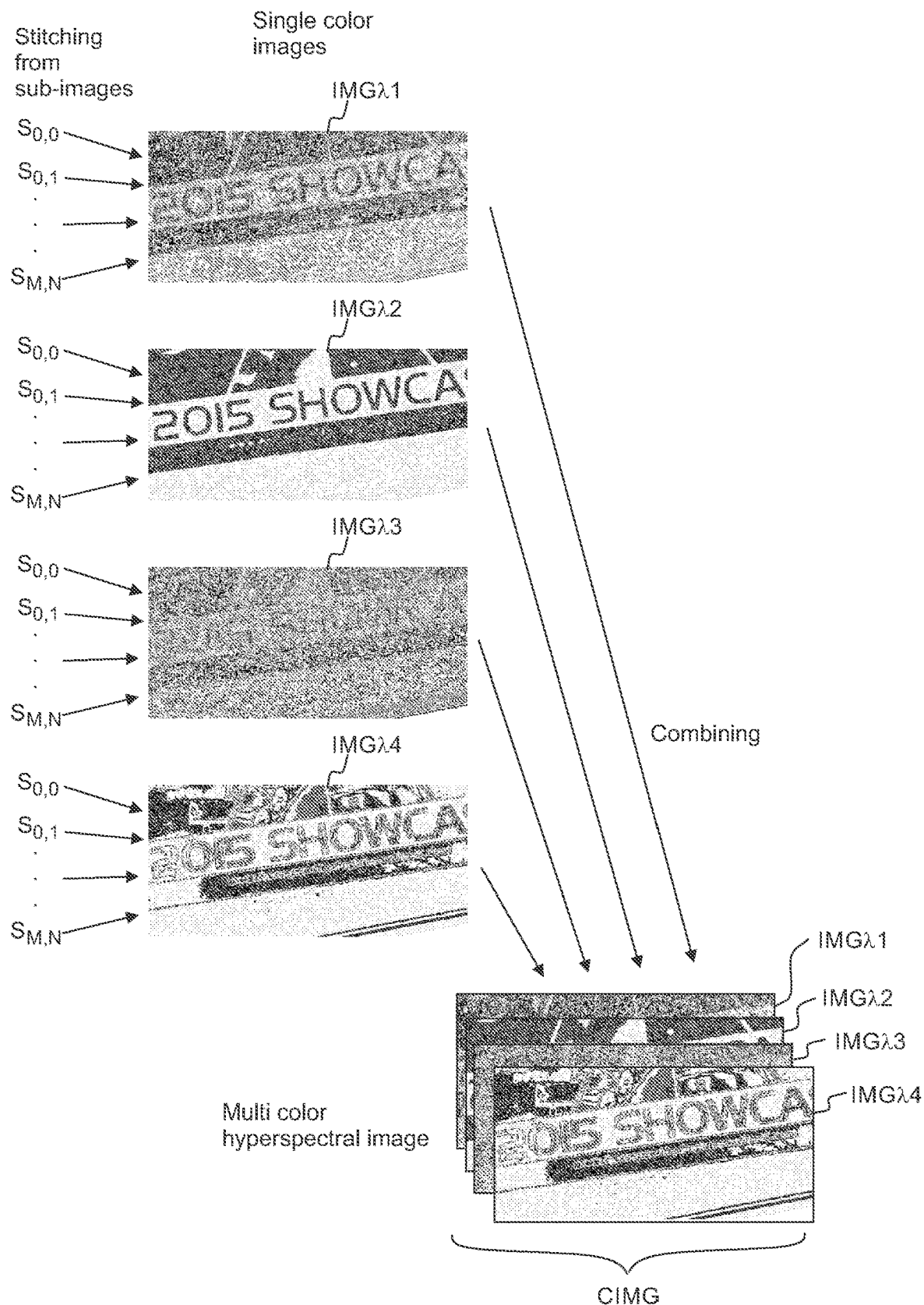
FIG. 6 shows, by way of example, forming a composite multi-wavelength image by stitching and combining.

Referring to FIG. 6, a spectral transmittance peak (e.g. PEAK1) of the Fabry-Perot interferometer FPI may be adjusted to a first wavelength $\lambda 1$ to capture a first set of sub-images S. The sub-images S of the first set may be stitched together to form a first spectral image IMG$\lambda 1$ of the object OBJ1.

A spectral transmittance peak (e.g. PEAK1) of the Fabry-Perot interferometer FPI may be adjusted to a second wavelength $\lambda 2$ to capture a second set of sub-images S. The sub-images S of the second set may be stitched together to form a second spectral image IMG$\lambda 2$ of the object OBJ1.

A spectral transmittance peak (e.g. PEAK1 or PEAK2) of the Fabry-Perot interferometer FPI may be adjusted to a third wavelength $\lambda 3$ to capture a third set of sub-images S. The sub-images S of the third set may be stitched together to form a third spectral image IMG$\lambda 3$ of the object OBJ1.

A spectral transmittance peak (e.g. PEAK1 or PEAK2) of the Fabry-Perot interferometer FPI may be adjusted to a fourth wavelength $\lambda 4$ to capture a fourth set of sub-images S. The sub-images S of the fourth set may be stitched together to form a fourth spectral image IMG$\lambda 4$ of the object OBJ1.

The spectral images IMG$\lambda 1$, IMG$\lambda 2$, IMG$\lambda 3$, IMG$\lambda 4$ may be combined to form a multi-spectral image CIMG. The multi-spectral image CIMG may also be called e.g. as hyperspectral cube. The image CIMG may comprise a three-dimensional array of pixel values, wherein each pixel value may represent a measured intensity value associated with transverse position coordinates (x,y) of said pixel and with a wavelength value of said pixel ($\lambda 1$, $\lambda 2$, $\lambda 3$, or $\lambda 4$).

The number of spectral positions ($\lambda 1$, $\lambda 2$, $\lambda 3$, or $\lambda 4$) used for capturing the image data for a single image CIMG may be e.g. in the range of 2 to 100.

In an embodiment, it may also be sufficient to form a single spectral image IMGλ1 without forming a multi-spectral image CIMG.

In an embodiment, the image data of the captured sub-images S may be used without stitching the sub-images S together. For example, change of an object OBJ1 may be detected by comparing captured sub-images S with reference data also without stitching the sub-images S together. A change of an optical property of the object OBJ1 may be detected by comparing the captured sub-images S with reference data.

In an embodiment, the interferometer FPI may be adjusted to a selected wavelength to capture a plurality of sub-images S, wherein the image data of the captured sub-images S may be used e.g. for background correction. The method may comprise capturing sub-images S without stitching the sub-images S together.

Figure 7A:
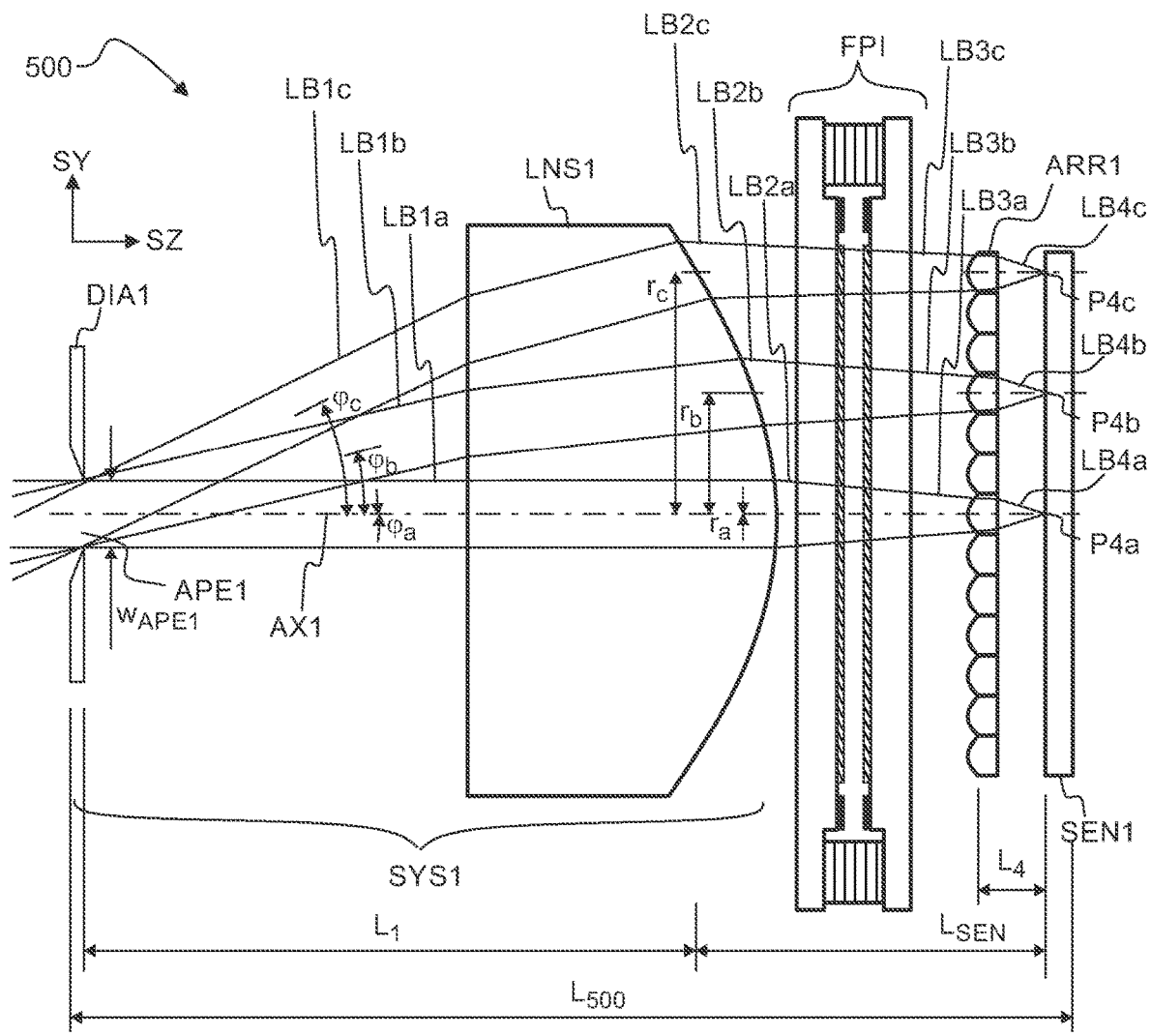
FIG. 7a shows, by way of example, in a cross-sectional side view, an imaging device, which comprises telecentric system, a Fabry-Perot interferometer, and a microlens array.

Referring to FIG. 7a, the modifier system SYS1 may comprise a telecentric system. The modifier system SYS1 may be an image-space telecentric lens system, which comprises an aperture APE1 and a lens LNS1. The distance between the aperture APE1 and the lens LNS1 may be selected such that the light beams LB2 formed by the modifier system SYS1 may be substantially parallel with the optical axis AX1 of the device 500.

The device 500 may receive a first light beam LB1a from a first object point P1a. The modifier system SYS1 may form a first axial beam AX1a from light of a the first received light beam LB1a. The angular orientation ($\varphi_a$) of the received beam LB1a may be mapped into a radial position ($r_a$) of the first axial light beam LB2a.

The modifier system SYS1 may form a substantially axial beam LB2 from light of each light beam LB1 received from the viewing sector VIEW1 of the device 500, wherein the radial position r of the formed axial beam AX2 may depend on the field angle φ of said received light beam LB1. The field angle φ may denote the angle between the centerline of the received beam LB1 and the optical axis AX1 of the device 500. The radial position r may indicate the distance between the centerline of the formed axial beam LB2 and the optical axis AX1 of the device 500. To the first approximation, the radial position (r) may be substantially proportional to the field angle (φ). For example, the modifier system SYS1 may form the axial beams LB2 such that $r = k_{SYS1} \cdot \varphi$, where $k_{SYS1}$ may denote a proportionality constant.

The device 500 may receive a second light beam LB1b from a second object point P1b. The modifier system SYS1 may form a second axial beam AX1b from light of a the second received light beam LB1b. The angular orientation ($\varphi_b$) of the received beam LB1b may be mapped into a radial position ($r_b$) of the second axial light beam LB2b.

The device 500 may receive a third light beam LB1c from a third object point P1c. The modifier system SYS1 may form a third axial beam AX1c from light of a the third received light beam LB1c. The angular orientation ($\varphi_c$) of the received beam LB1c may be mapped into a radial position ($r_c$) of the third axial light beam LB2b.

The Fabry-Perot interferometer FPI may form transmitted light beams LB3a, LB3b, LB3c by filtering light of the axial light beams LB2a, LB2b, LB2c.

The lens array ARR1 may form a plurality of sub-images S by focusing light of the transmitted light beams LB3a, LB3b, LB3c to the image sensor SEN1.

The distance $L_1$ between the aperture APE1 and principal plane of the lens LNS1 may be e.g. substantially equal to the focal length $f_{LNS1}$ of the lens LNS1 of the telecentric system SYS1. The focal length of the lens LNS1 may be e.g. in the range of 2 mm to 20 mm, advantageously in the range of 4 mm to 8 mm.

The aperture APE1 may be e.g. circular or rectangular. The diameter or width $w_{APE1}$ of the aperture APE1 may be e.g. in the range of 0.2 mm to 2 mm.

The diameter or width $w_{APE1}$ of the aperture APE1 may be selected to provide a desired spectral resolution of the Fabry-Perot interferometer FPI. Selecting a smaller aperture APE1 may improve spectral resolution. The device 500 may comprise a diaphragm DIA1 to define the aperture APE1.

L4 may denote the distance between the image sensor SEN1 and the principal plane of the lenses of the lens array ARR1. The distance L4 may be selected such that the lenses of the lens array ARR1 may form substantially sharp sub-images of the object OBJ1 on the image sensor SEN1. For example, the distance L4 may be smaller than the focal length of the lenses LNS of the lens array ARR1. The device 500 may be arranged to operate such that the lens array ARR1 does not form a sharp image of the input aperture APE1 on the image sensor SEN1.

The distance L4 may be selected such that at least one of lens of the array ARR1 may form a sharp image F1' of a feature F1 of the object OBJ1 on the image sensor SEN1. The distance L4 may be selected such that at least one of lens of the array ARR1 may form a sharp image point (P4) of an object point (P1) on the image sensor SEN1. In an embodiment, the distance $L_0$ between the object OBJ1 may be e.g. greater than or equal to 100 times the length $L_{500}$ of the device 500. In an embodiment, the object OBJ1 may be at infinite distance. The distance L4 may be selected to provide a sharp image point for an object point located at infinite distance.

$L_{SEN}$ may denote the distance between the image sensor SEN1 and the principal plane of the lens LNS1 of the telecentric system SYS1. Using the lens array ARR1 may substantially reduce the distance $L_{SEN}$. Using the lens array ARR1 may substantially reduce the total external length $L_{500}$ of the spectral imaging device 500, in the direction of the optical axis AX1.

Figure 7B:
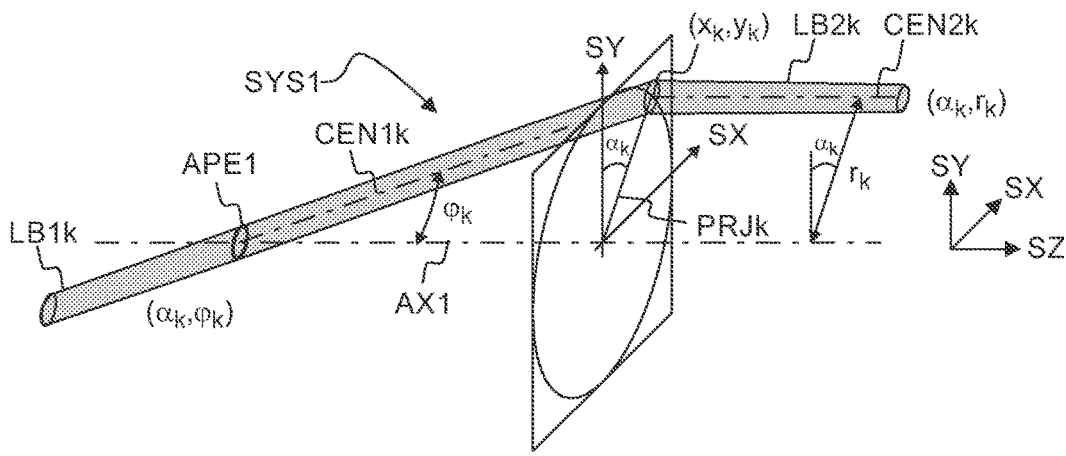
FIG. 7b shows, by way of example, in a three-dimensional view, forming an axial light beam from a received light beam.
Figure 8A:
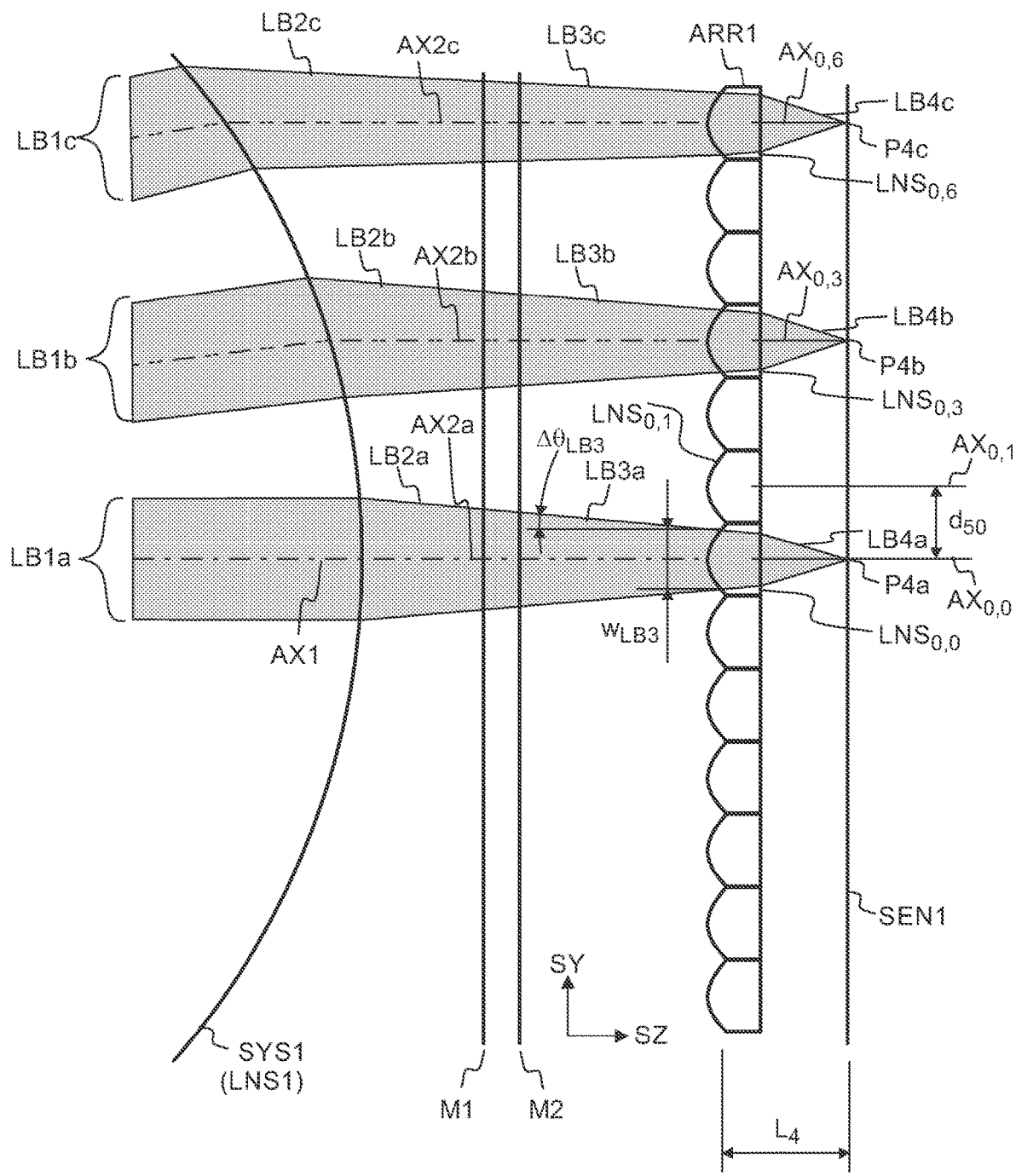
FIG. 8a shows, by way of example, in a cross-sectional side view, forming image points by focusing light with the microlenses.
Figure 8B:
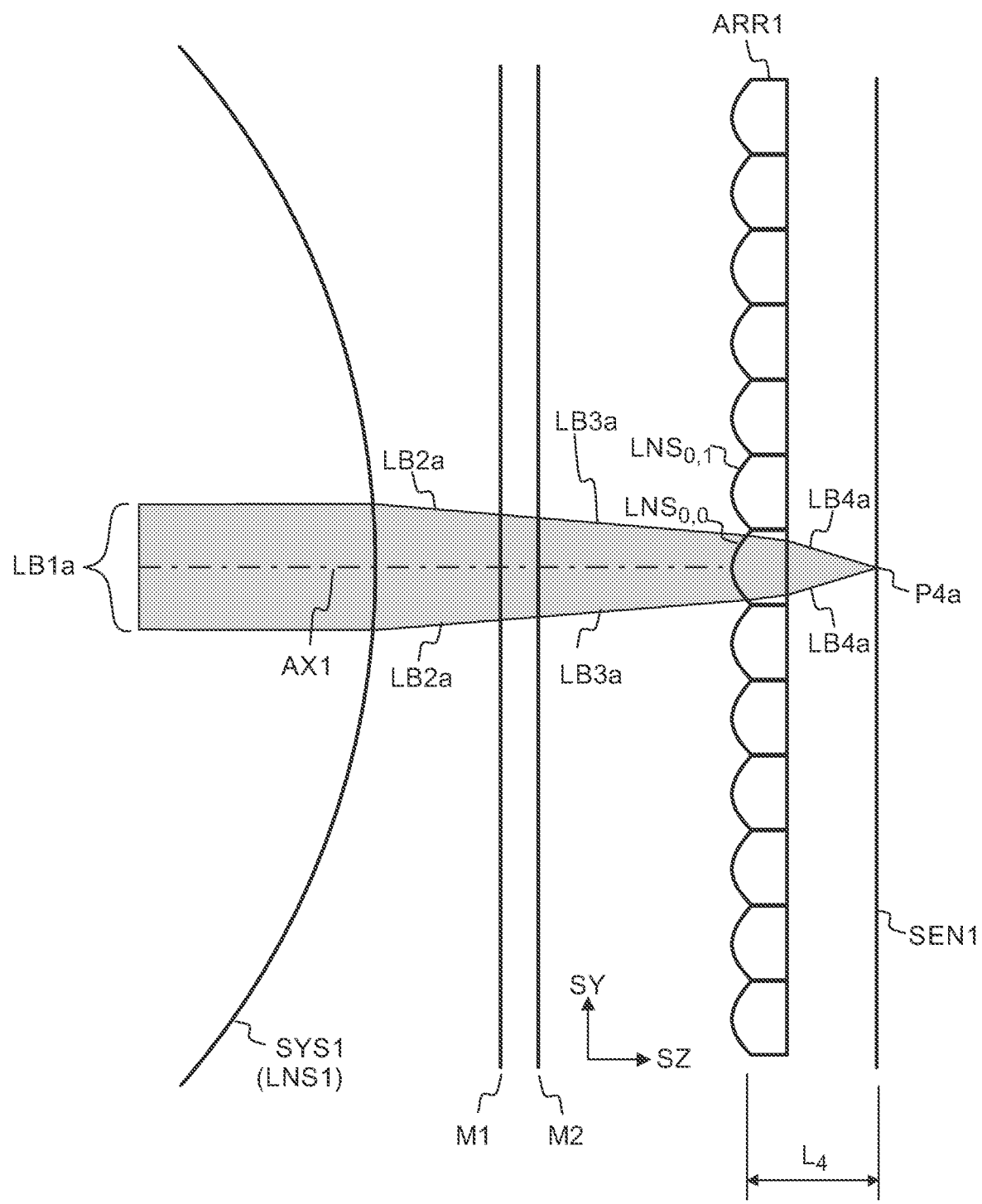
FIG. 8b shows, by way of example, in a cross-sectional side view, forming a first image point in a situation where the center of a first axial beam coincides with the center of a first microlens.
Figure 8C:
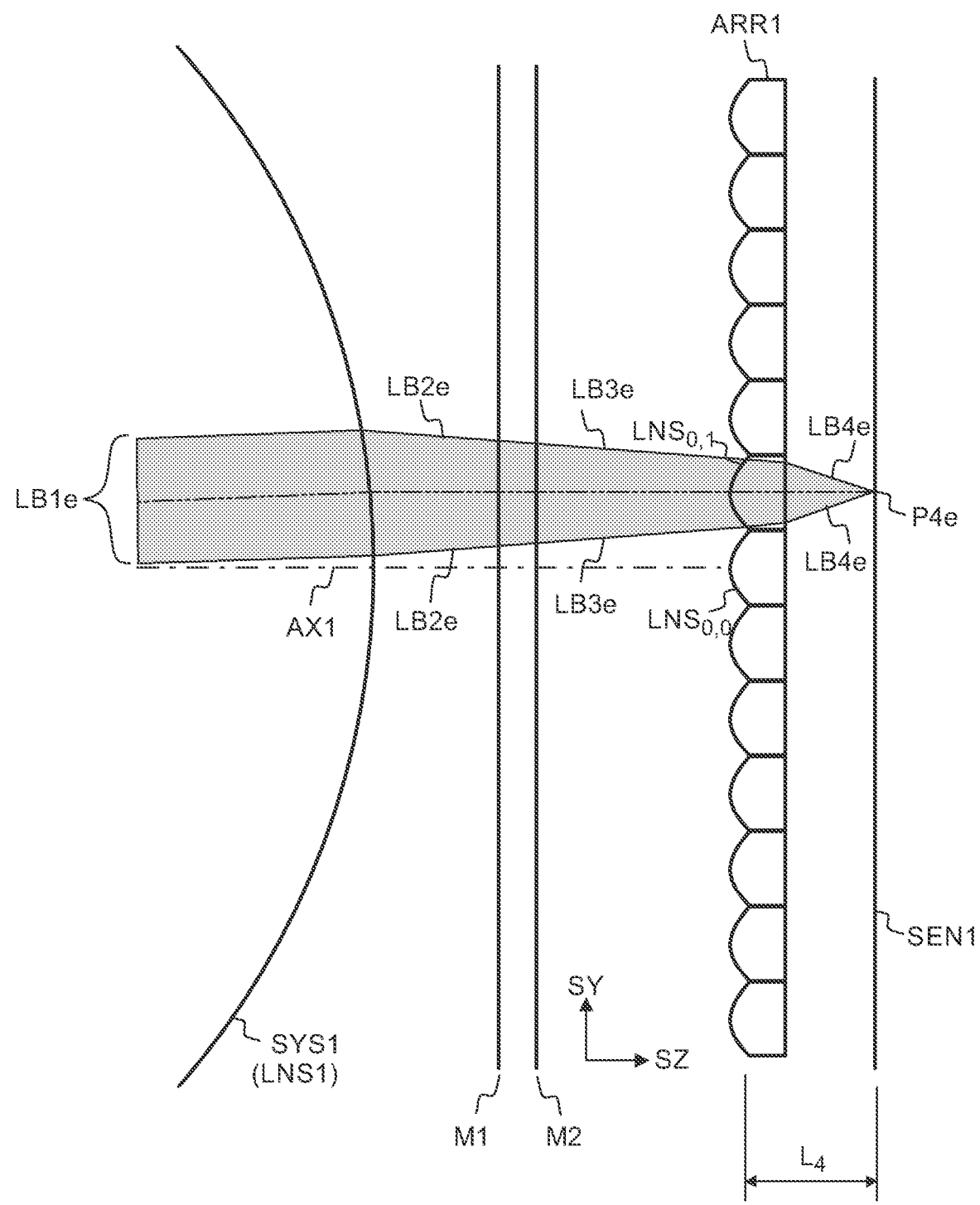
FIG. 8c shows, by way of example, in a cross-sectional side view, forming a second image point in a situation where the center of a second axial beam coincides with the center of a second microlens.
Figure 8D:
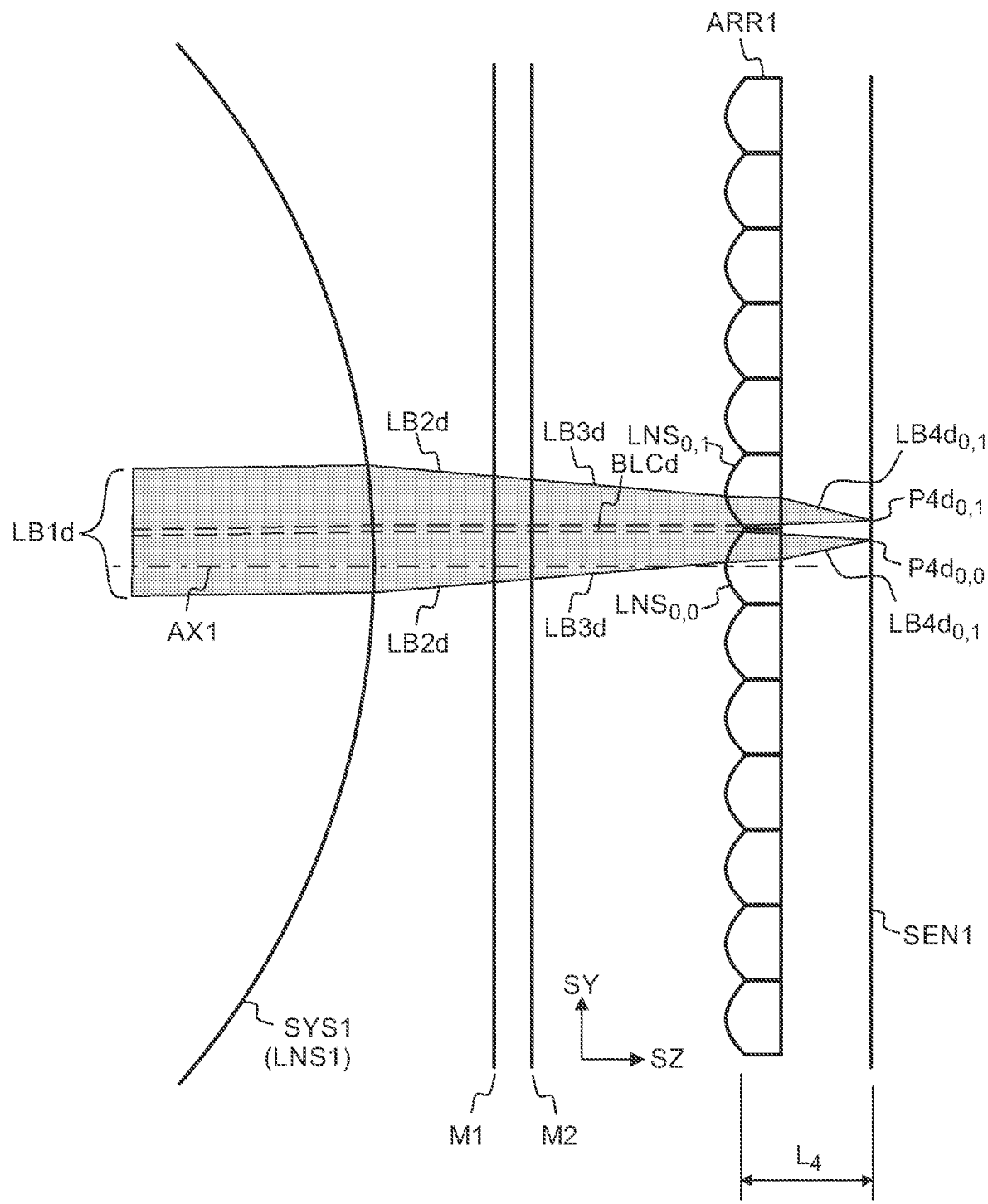
FIG. 8d shows, by way of example, in a cross-sectional side view, forming a first image point and a second image point in a situation where the third axial beam overlaps the first microlens and the second microlens.

Referring to FIG. 7b, the modifier system SYS1 may convert each received light beam LB1 into a corresponding axial light beam LB2. Each received beam LB1 has a centerline CEN1. Each axial beam has a centerline CEN2. The direction of each received light beam LB1 may be specified e.g. by angles (α,φ). The angle α may be called e.g. as the azimuth angle. The azimuth angle α may denote the angle between the direction SY and the projection (PRJ) of the centerline CEN1 on the plane defined by the directions SY and SX. The angle φ may be called e.g. as the field angle. The field angle may denote the angle between the optical axis AX1 and the centerline CEN1 of the light beam LB1. The transverse position of each corresponding axial beam LB2 may be specified e.g. by the radial position (r) and by the azimuth angle (α). The radial position r may denote the distance between the centerline CEN2 and the optical axis AX1. The transverse position of the centerline CEN2 may also be defined by cartesian coordinates (x,y). The coordinate x may define a position in the direction SX, and the coordinate y may define a position in the direction SY.

The modifier system may form the axial beam LB2 from light of the received beam LB1 such that the radial position (r) of the axial beam LB2 is substantially proportional to the field angle D of the received beam.

The modifier system SYS1 may form an axial beam LB2$k$ from light of a received input beam LB1$k$. The input beam LB1$k$ has a direction ($\alpha_k, \varphi_k$). The axial beam has a transverse position ($\alpha_k, r_k$).

Referring to FIG. 8$a$, the transmitted beams LB3 may be converging or diverging. The (half) divergence angle $\Delta\theta_{LB3}$ may denote the maximum angle between light rays of the beam LB3 and the optical axis AX1. Each transmitted beam LB3 propagating via the lens array ARR1 to the image sensor SEN1 may have a divergence $\Delta\theta_{LB3}$. The divergence $\Delta\theta_{LB3}$ may have an effect on the spectral resolution of the Fabry-Perot interferometer FPI. Reducing the divergence $\Delta\theta_{LB3}$ may improve resolution.

The transmitted light beam LB3 may have a width $w_{LB3}$ at the input surface of the lens array ARR1. $d_{50}$ may denote the distance between centers ($\Delta X_{0,0}$, $\Delta X_{0,1}$) of adjacent lenses (LNS$_{0,0}$, LNS$_{0,1}$) of the array ARR1. The pitch distance $d_{50}$ of the array ARR1 may be e.g. in the range of 25% to 100% of the width $w_{LB3}$ so as to provide sufficient spatial resolution and to facilitate stitching of the sub-images S.

The lens array ARR1 may comprise a plurality of lenses arranged in a rectangular M×N array. The number (N) of rows of the lens array ARR1 may be e.g. greater than or equal to 8, and the number (M) of columns of the lens array may be e.g. greater than or equal to 8.

The number (N) of rows of the lens array ARR1 may be e.g. greater than or equal to 2, and the number (M) of columns of the lens array may be e.g. greater than or equal to 2. Using a 2×2 lens array may already provide significant reduction of the length of the device.

The device 500 may form an image point P4$a$ from light of a light beam LB1$a$ received from an object point P1$a$. The device 500 may form an image point P4$b$ from light of a light beam LB1$b$ received from an object point P1$b$. The device 500 may form an image point P4$c$ from light of a light beam LB1$c$ received from an object point P1$c$.

FIG. 8$b$ illustrates how light of a light beam LB1$a$ received from an object point P1$a$ may form an image point P4$a$ of a first sub-image $S_{0,0}$. A first lens LNS$_{0,0}$ of the array ARR1 may form the first sub-image $S_{0,0}$.

FIG. 8$c$ illustrates how light of a light beam LB1$e$ received from an object point P1$e$ may form an image point P4$e$ of a second sub-image $S_{0,1}$. A second adjacent lens LNS$_{0,1}$ of the array ARR1 may form a second sub-image $S_{0,1}$.

FIG. 8$d$ illustrates how light of a light beam LB1$d$ received from the same object point P1$d$ may form two different image points (P4$d_{0,0}$, P4$d_{0,1}$) appearing in two adjacent sub-images ($S_{0,0}$, $S_{0,1}$). This feature may allow forming a continuous larger image (IMG$\lambda$1) by stitching the sub-images ($S_{0,0}$, $S_{0,1}$) together.

A first lens LNS$_{0,0}$ of the array ARR1 may form a first sub-image $S_{0,0}$. A second adjacent lens LNS$_{0,1}$ of the array ARR1 may form a second adjacent sub-image $S_{0,1}$.

The system SYS1 may form an axial light beam LB2$d$ from light of the received light beam LB1$d$. The interferometer FPI may form an axial filtered light beam LB3$d$ by filtering light of the axial light beam LB2$d$. The transmitted light beam LB3$d$ may overlap a first lens LNS$_{0,0}$ and a second adjacent lens LNS$_{0,1}$ of the array ARR1. The first lens LNS$_{0,0}$ may form a first focused beam LB4$d_{0,0}$ by focusing a first part of the transmitted light beam LB3$d$. The focused beam LB4$d_{0,0}$ may impinge on the image sensor SEN1 to form the first image point P4$d_{0,0}$. The first sub-image $S_{0,0}$ may comprise the first image point P4$d_{0,0}$. The second lens LNS$_{0,1}$ may form a second focused beam LB4$d_{0,1}$ by focusing a second part of the transmitted light beam LB3$d$. The focused beam LB4$d_{0,1}$ may impinge on the image sensor SEN1 to form the second image point P4$d_{0,1}$. The second sub-image $S_{0,1}$ may comprise the second image point P4$d_{0,1}$.

In an embodiment, the transverse position of the first image point P4$d_{0,0}$ with respect to the transverse position of the second image point P4$d_{0,1}$ may depend on the distance ($L_0$) between the object point P1$d$ and the spectral imaging device 500. This phenomenon may be significant at small distances $L_0$, for example at distances $L_0$ where the ratio $w_{APE1}/L_0$ is greater than 1%. Consequently, the method may comprise determining a distance ($L_0$) between an object point (P1$d$) and the spectral imaging device 500 (by triangulation) from the relative position of the second image point (P4$d_{0,1}$) with respect to the first image point (P4$d_{0,0}$). The device may be arranged to determine distance values for a plurality of different object points, e.g. for measuring three-dimensional geometric form of the object. The determined distance may also be used e.g. for autofocusing. The determined distance may also be used e.g. for verifying a distance which has been determined by another method.

Figure 9:
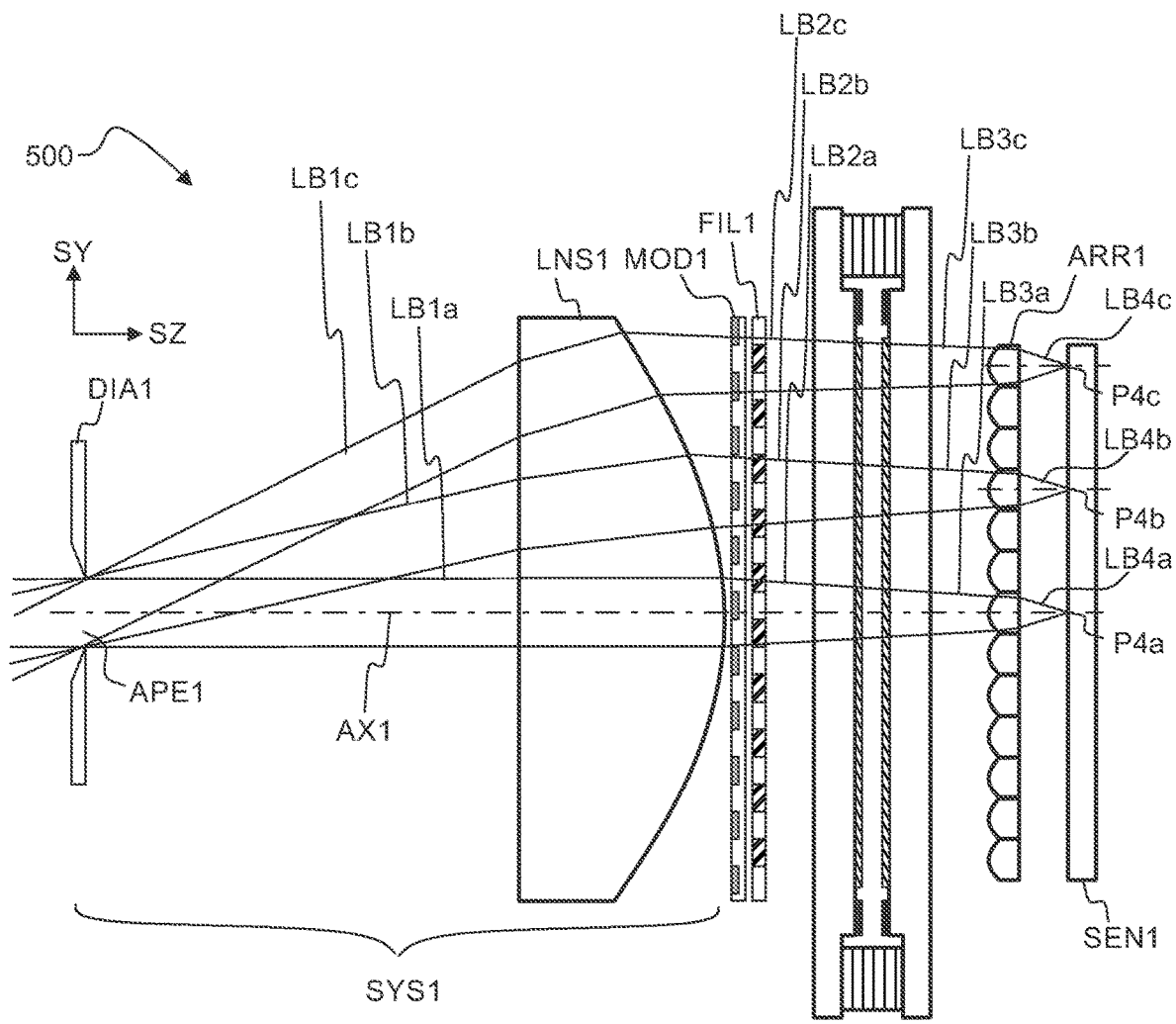
FIG. 9 shows, by way of example, in a cross-sectional side view, an imaging device which comprises a modulator array and a filter array.

Referring to FIG. 9, the spectral imaging device 500 may comprise a combination of a modulator array MOD1 and a filter array FIL1 e.g. in order to enable using one of the several transmittance peaks (PEAK1, PEAK2) of the Fabry-Perot interferometer FPI. The modulator array MOD1 may comprise e.g. a plurality of first modulable regions and a plurality of second modulable regions. The transmittance of the modulable regions may be changed e.g. by a control signal. The filter array FIL1 may comprise e.g. a plurality of first optical spectral filter regions, and a plurality of second optical spectral filter regions. The spectral transmittance of the first filter regions may be different from the spectral transmittance of the second filter regions. The transverse positions of the first modulable regions may match the transverse positions of the first filter regions. A first transmittance peak PEAK1 of the interferometer may be at a first wavelength ($\lambda$1), and a second transmittance peak of the interferometer may be at a second wavelength ($\lambda$2). The modulator array MOD1 may be first controlled to allow light at the first wavelength ($\lambda$1) to propagate to the image sensor SEN1, wherein the modulator array MOD1 may prevent propagation of light at the second wavelength ($\lambda$2). Next, the modulator array MOD1 may be controlled to allow light at the second wavelength ($\lambda$2) to propagate to the image sensor SEN1, wherein the modulator array MOD1 may prevent propagation of light at the first wavelength ($\lambda$1). The modulator array MOD1 may be e.g. a liquid crystal modulator.

Referring to FIG. 10$a$, the modifier system SYS1 may comprise a combination of a negative lens LNS2 and a limiter unit NAL2. The lens LNS2 may have a negative focal length. The limiter unit NAL2 may prevent propagation of light rays which are outside a predetermined acceptance cone ($\theta_{LIM}$). The negative lens LNS2 and the limiter unit NAL2 may together form an afocal system. The afocal system of FIG. 10$a$ may further reduce the axial length of the device 500.

In an embodiment, the limiter unit NAL2 of the afocal system SYS1 may also be positioned between the Fabry-Perot interferometer FPI and the lens array ARR1. The limiter unit NAL2 may allow propagation of axial filtered light beams LB3 to the lens array ARR1, wherein the limiter unit NAL2 may eliminate unwanted light rays which are outside the acceptance cone. The limiter unit NAL2 may be e.g. a stack of aperture arrays. The limiter unit NAL2 may be e.g. a fiber optic array.

The system SYS1 may form axial light beams (LB2a, LB2b, LB2c) from received light beams (LB1a, LB1b, LB1c) such that the radial position (r) of each axial beam depends on the field angle (φ) of the corresponding received beam. The system SYS1 may form axial light beams (LB2a, LB2b, LB2c) from received light beams (LB1a, LB1b, LB1c) such that the radial position (r) of each axial beam may be substantially proportional to the field angle (φ) of the corresponding received beam.

Referring to FIG. 10b, the modifier system SYS1 may comprise one or more Fresnel lenses and/or diffractive lenses. Using a Fresnel lens or a diffractive lens may allow further reduction of the length L500 of the device 500.

For example, an afocal system may comprise a combination of a Fresnel lens LNS2 and a limiter unit NAL2. The limiter unit NAL2 may be e.g. a stack of aperture arrays. The limiter unit NAL2 may be e.g. a fiber optic array.

Figure 10C:
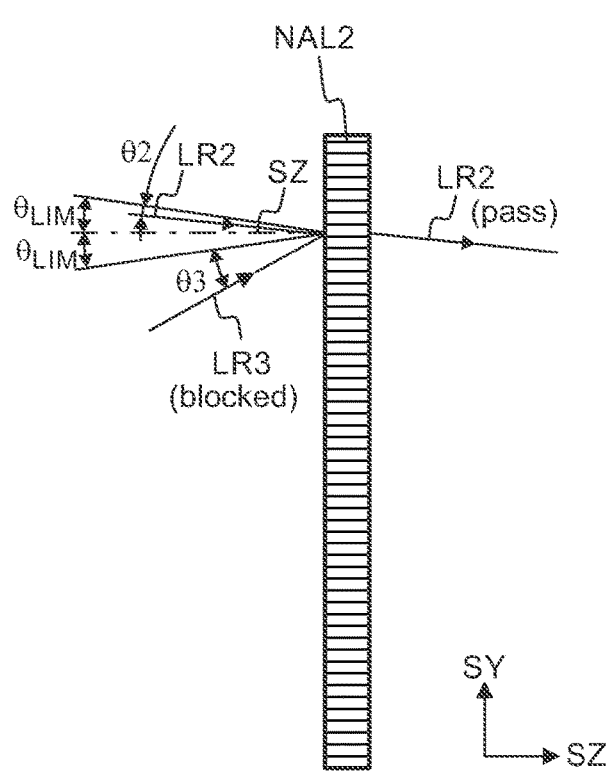
FIG. 10c shows, by way of example, in a cross-sectional side view, a limiter unit of the afocal system.

Referring to FIG. 10c, θ2 denotes an angle between a light ray LR2 and the optical axis AX1. θ3 denotes an angle between a light ray LR3 and the optical axis AX1. The angles θ2, θ3 may be called e.g. as input angles. $\theta_{LIM}$ denotes an acceptance angle of the limiter unit NAL2. The limiter unit NAL2 may allow propagation of a light ray through the limiter unit NAL2 if the input angle θ of said light ray is smaller than or equal to the acceptance angle $\theta_{LIM}$. The limiter unit NAL2 may prevent propagation of a light ray through the limiter unit NAL2 if the input angle θ of said light ray is greater than the acceptance angle $\theta_{LIM}$. The limiter unit NAL2 may be implemented e.g. by an array of optical fibers. The limiter unit NAL2 may be e.g. a fiber optic array. The limiter unit NAL2 may be e.g. a stack of aperture arrays (FIG. 10b). The acceptance angle $\theta_{LIM}$ may be e.g. in the range of 1 to 10°.

Figure 11:
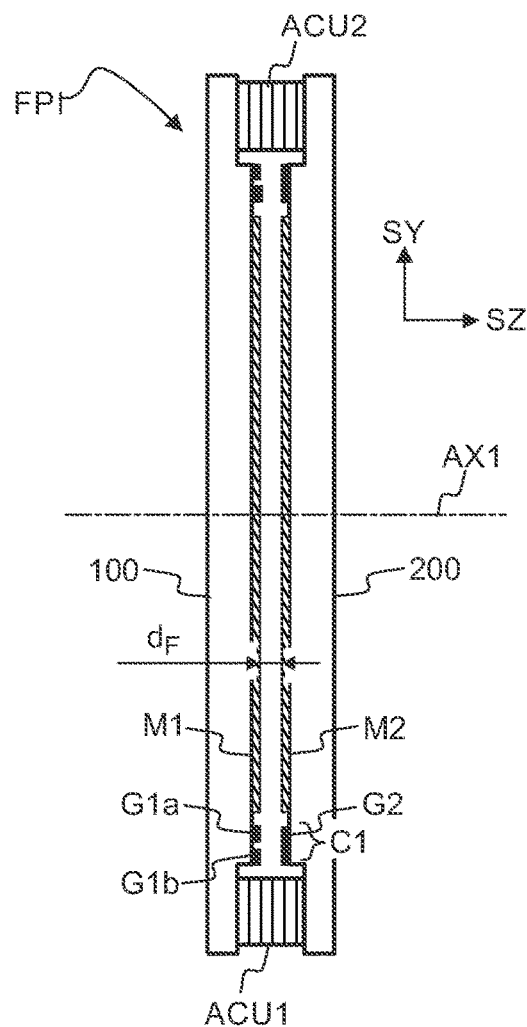
FIG. 11 shows, by way of example, in a cross-sectional side view, a Fabry-Perot interferometer.

Referring to FIG. 11, The interferometer FPI may comprise a first semi-transparent mirror M1 implemented on a first mirror plate 100, and a second semi-transparent mirror M2 implemented on a second mirror plate 200. The interferometer may comprise one or more actuators ACU1 to change the distance $d_F$ between the first mirror M1 and the second mirror M2.

The width of the mirrors M1, M2 of the interferometer may be e.g. in the range of 2 mm to 50 mm. The semi-transparent mirrors M1, M2 of the interferometer may be produced with a high degree of accuracy. The deviations of the semi-transparent mirror from the perfect planar shape may initially be e.g. smaller than λ/200. The flatness of the mirror M1, M2 may be e.g. better $\lambda_N/200$, in order to provide a suitable finesse (i.e. the ratio of the free spectral range to the spectral width of a transmission peak). $\lambda_N$ denotes a predetermined operating wavelength. The predetermined operating wavelength $\lambda_N$ may be e.g. in the range of 500 nm to 4000 nm. The distance $d_F$ between the semi-transparent mirrors M1, M2 may be e.g. in the range of 0.2 μm to 1 mm, depending on the desired spectral resolution and depending on the desired free spectral range.

The width of the light-detecting area of the image sensor SEN1 may be e.g. greater than or equal to the width of the mirrors M1, M2. The width of the lens array ARR1 may be e.g. greater than or equal to the width of the mirrors M1, M2.

The second mirror M1 may be substantially parallel with the first mirror M1 during operation. The mirrors M1, M2 may have e.g. a substantially circular form or a substantially rectangular form.

The distance $d_F$ between the mirrors M1, M2 may be adjusted to provide constructive interference for transmitted light at one or more given wavelengths so that the interferometer FPI may transmit light. The distance $d_F$ may also be adjusted to provide destructive interference for transmitted light at the given wavelength so that the interferometer FPI may reflect light.

The mirror distance $d_F$ may be adjusted by one or more actuators ACU1, ACU2. One or more actuators may be arranged to move the second mirror plate 200 with respect to the first mirror plate 100. The actuator ACU1, ACU2 may be e.g. a piezoelectric actuator, an electrostatic actuator, an electrostrictive actuator, or a flexoelectric actuator.

The semi-transparent mirrors M1, M2 may be e.g. dielectric multilayer coatings deposited on a transparent substrate. The semi-transparent mirrors M1, M2 may be e.g. metallic coatings deposited on a transparent substrate. The substrate material of the mirror plates 100, 200 may be transparent in the operating wavelength range of the interferometer 300. The material of the mirror plates 100, 200 may be e.g. glass, silica, silicon or sapphire. The mirror plates 100, 200 may comprise ceramic material. The mirror plates 100, 200 may comprise dimensionally stable material, which is transparent in the operating range of wavelengths of the spectral imaging device 500.

The interferometer FPI may optionally comprise capacitive sensor electrodes G1a, G1b, G2 for capacitively monitoring mirror distance $d_F$. Sensor electrodes G1a, G1b, G2 may together form a sensor capacitor C1, wherein the capacitance value of the sensor capacitor C1 may depend on the mirror distance $d_F$. Consequently, the mirror distance $d_F$ may be monitored by monitoring the capacitance value of the sensor capacitor C1. The sensor capacitor C1 may be connected to a capacitance monitoring unit 410 e.g. by conductors CONa, CONb (FIG. 12).

Figure 12:
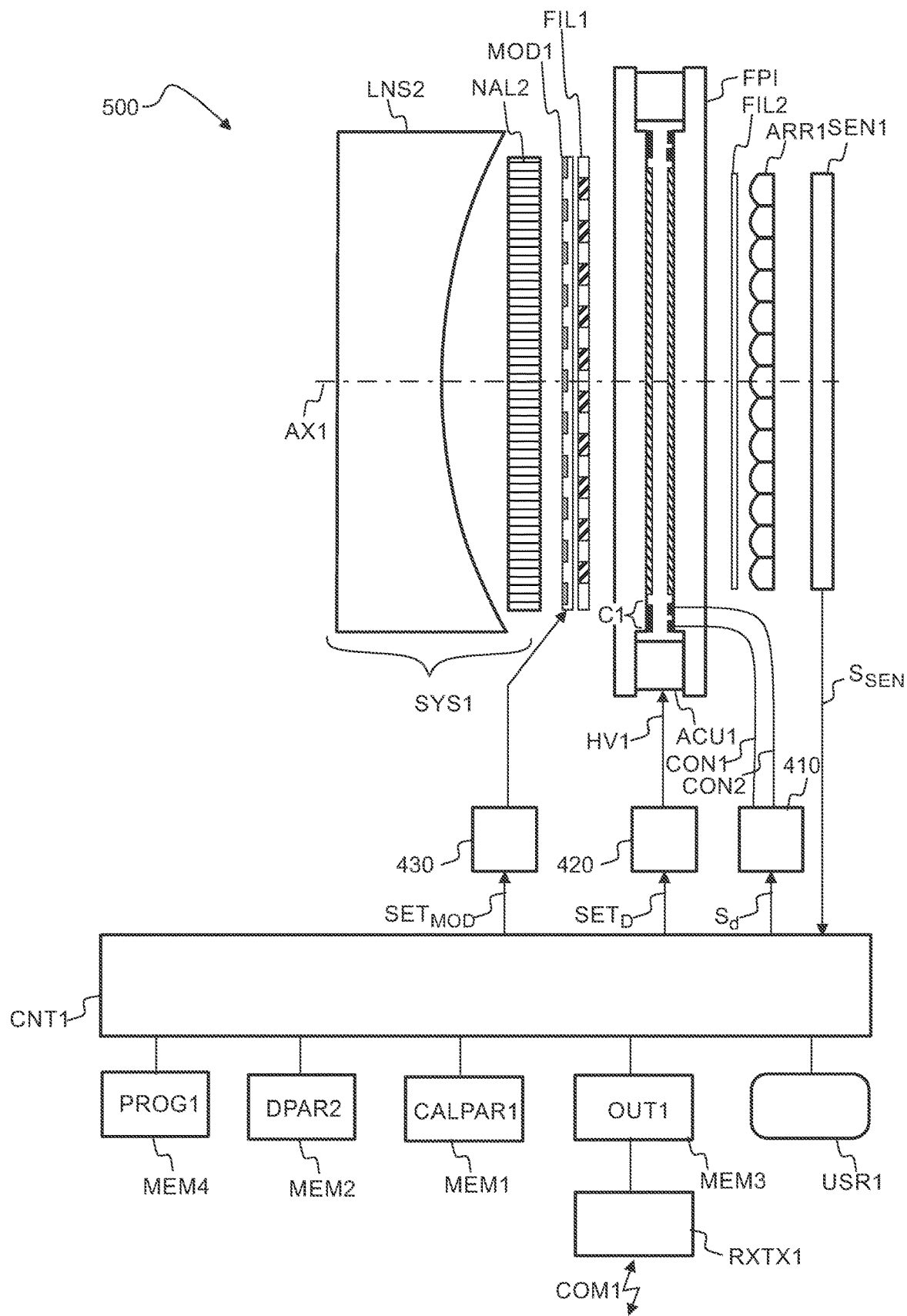
FIG. 12 shows, by way of example, a spectral imaging device.

Referring to FIG. 12, the imaging device 500 may comprise a control unit CNT1. The control unit CNT1 may be arranged to send a control signal $SET_D$ to the interferometer FPI in order to adjust the mirror gap $d_F$. The interferometer FPI may comprise a driver unit 420. The driver unit 420 may e.g. convert a digital control signal $SET_D$ into an analog signal suitable for driving one or more actuators. The driver unit 420 may provide a signal HV1 for driving an actuator.

The driver unit 420 may provide e.g. a high voltage signal HV1 for driving a piezoelectric actuator. The interferometer FPI may optionally comprise means for monitoring the distance $d_F$ between the mirrors and/or the mirror plates. The interferometer FPI may comprise e.g. capacitive means for monitoring the distance. The interferometer FPI may comprise e.g. inductive means for monitoring the distance. The interferometer FPI may comprise e.g. interferometric means for monitoring the distance.

The interferometer FPI may comprise e.g. capacitive sensor electrodes for capacitively monitoring mirror distance $d_F$. Sensor electrodes may together form a sensor capacitor C1, wherein the capacitance value of the sensor capacitor C1 may depend on the mirror distance $d_F$. Consequently, the mirror distance $d_F$ may be monitored by monitoring the capacitance value of the sensor capacitor C1. The sensor capacitor C1 may be connected to a capacitance monitoring unit 410 e.g. by conductors CONa, CONb. The capacitance monitoring unit 410 may provide a sensor signal $S_d$ indicative of the mirror distance $d_F$.

The capacitance monitoring unit 410 may provide a sensor signal $S_d$. The sensor signal may be used for monitoring the mirror gap $d_F$. The spectral response of the interferometer FPI may be calibrated e.g. as a function of the mirror gap $d_F$. The device 500 may comprise a memory MEM2 for storing spectral calibration parameters DPAR2. The mirror gap $d_F$ and/or a spectral position λ may be determined from the sensor signal $S_d$ e.g. by using the spectral calibration parameters DPAR2.

The image sensor SEN1 may provide image data, which may be communicated as an image data signal $S_{SEN}$. The image data signal $S_{SEN}$ may comprise e.g. the pixel values of an image frame captured at a selected wavelength.

The device 500 may optionally comprise a memory MEM1 for storing intensity calibration parameters CALPAR1. The device 500 may be arranged to obtain pixel values from the image sensor SEN1, and to determine intensity values $X(\lambda)$ from the pixel values by using one or more intensity calibration parameters CALPAR1. An intensity value $X(\lambda)$ of the light LB1 may be determined from a pixel value of a captured image frame as a function of the position (x,y) of the pixel and/or as a function of the mirror distance value $d_F$, by using the one or more intensity calibration parameters CALPAR1. Calibrated intensity value may be determined for each pixel of a captured wavelength image, respectively.

The image sensor SEN1 may be e.g. a CMOS sensor or a CCD sensor. CMOS means complementary metal oxide. CCD means charge coupled device.

The device 500 may optionally comprise a memory MEM3 for storing output OUT1. The output OUT1 may comprise e.g. pixel values of one or more captured images IMG$\lambda$1, IMG$\lambda$2, one or more calibrated intensity values, and/or one or more combined images CIMG.

The device 500 may optionally comprise one or more filters FIL2 to at least partly define one or more passbands PB1.

The device 500 may optionally comprise a modulator array MOD1, a filter array FIL1, and a driver unit 430 for changing the state of the modulator array MOD1. The driver unit 430 may change the state of the modulator array MOD1 according to a modulator control signal $SET_{MOD}$ received from the control unit CNT1.

The device 500 may comprise a memory MEM4 for storing a computer program PROG1. The computer program PROG1 may be configured, when executed by one or more data processors (e.g. CNT1), cause the apparatus 500, FPI to perform one or more of the following:
 measure a distance $d_F$ between the mirrors M1, M2,
 adjust parallelism (tilt angle) of the mirrors M1, M2.
 set a transmittance peak of the interferometer FPI to a selected position (e.g. $\lambda$1),
 control an optical modulator (MOD1) to enable or disable a passband (PB1),
 cause spectral scanning of the interferometer FPI (e.g. from $\lambda$1 to $\lambda$2),
 capture a plurality of sub-images $S_{0,0}$, $S_{0,1}$, . . .
 form a spectral image IMG$\lambda$1 by stitching the sub-images $S_{0,0}$, $S_{0,1}$, . . .
 form a combined image CIMG,
 form a calibrated spectral image from captured pixel values.

The device 500 may optionally comprise a user interface USR1 e.g. for displaying information to a user and/or for receiving commands from the user. The user interface USR1 may comprise e.g. a display, a keypad and/or a touch screen.

The device 500 may optionally comprise a communication unit RXTX1. The communication unit RXTX1 may transmit and/or receive a signal COM1 e.g. in order to receive commands, to receive calibration data, and/or to send output data OUT1. The communication unit RXTX1 may have e.g. wired and/or wireless communication capabilities. The communication unit RXTX1 may be arranged to communicate e.g. with a local wireless network (Bluetooth, WLAN), with the Internet and/or with a mobile communications network (4G, 5G).

The object OBJ1 may be e.g. a real object or a virtual object. A real object OBJ1 may be e.g. in solid, liquid, or gaseous form. The real object OBJ1 may be a cuvette filled with a gas. The real object OBJ1 may be e.g. a plant (e.g. tree or a flower), a combustion flame, or an oil spill floating on water. The real object OBJ1 may be e.g. the sun or a star observed through a layer of absorbing gas. The real object may be e.g. an image printed on a paper. A virtual object OBJ1 may be e.g. an optical image formed by another optical device.

The object may be e.g. a biological object, e.g. human body, animal body, tissue sample, or a plant. The object may be e.g. an inorganic object, e.g. a mineral sample or a gaseous sample. The formed spectral image (CIMG) may be compared with reference data e.g. in order to identify the object OBJ1. The formed spectral image (CIMG) may be compared with reference data e.g. in order to determine whether the object belongs to a given category or not. The formed spectral image (CIMG) may be compared with reference data e.g. in order to determine whether the state of the object is normal or abnormal.

The device 500 may be arranged to capture spectral images, which represent two or more wavelengths ($\lambda$1, $\lambda$2, $\lambda$3, $\lambda$4) selected e.g. from the range of 600 nm to 1050 nm. The device 500 may be arranged to capture spectral images, which represent several wavelengths ($\lambda$1, $\lambda$2, $\lambda$3, $\lambda$4) selected e.g. from the visible and/or near infrared range. The device 500 may be arranged to capture spectral images, which represent two or more wavelengths ($\lambda$1, $\lambda$2, $\lambda$3, $\lambda$4) selected e.g. from the range of 950 nm to 1700 nm. The device 500 may be arranged to capture spectral images, which represent two or more wavelengths ($\lambda$1, $\lambda$2, $\lambda$3, $\lambda$4) selected e.g. from the shortwave infrared (SWIR) range. The image sensor SEN1 may be e.g. an InGaAs image sensor.

The dimensions of the spectral imaging device 500 may be selected e.g. such that angular distribution ($\Delta\theta_{LB3}$) of light rays transmitted through the Fabry-Perot interferometer is as narrow as possible.

The F-number of the lenses of the lens array may be e.g. as small as possible in order to minimize the length of the device 500. The F-number of a lens is equal to the ratio f/D, where f denotes the focal length of said lens and D denotes the diameter of said lens.

The one or more dimensions of the device 500 may be selected to optimize performance. Said dimensions may include e.g. the width $w_{APE1}$ of the input aperture APE1, the focal length of the lens (LNS1 or LNS2) of the light beam modifier system SYS1, the focal length of the lenses of the lens array ARR1, and/or the pitch dimension $d_{50}$ between centers of adjacent lenses of the lens array ARR1.

Selecting a small aperture size ($w_{APE1}$) may improve spectral resolution of the Fabry-Perot interferometer. The aperture size ($w_{APE1}$) may be selected to be large enough so as to enable stitching of the sub-images.

By way of example, the width $w_{APE1}$ of the aperture APE1 of the telecentric system SYS1 may be e.g. substantially equal to 1.2 mm. The focal length of the lens LNS1 of the telecentric system SYS1 may be e.g. substantially equal to 6 mm. The width of the mirror M1, M2 may be e.g. substantially equal to 5 mm. The length $L_{500}$ of the spectral imaging device 500 may be e.g. substantially equal to 9 mm. The lens array ARR1 may comprise e.g. a rectangular 15×15 array of microlenses LNS. The pitch dimension $d_{50}$ of the lens array ARR1 may be e.g. substantially equal to 0.25 mm. The focal length of the lenses of the lens array ARR1 may be e.g. substantially equal to 1 mm. The image sensor SEN1 may comprise e.g. a rectangular 640×480 array of detector pixels. The diagonal field of view (VIEW1) may be e.g. substantially equal to 40°. The distance $L_0$ between the object OBJ1 and the device 500 may be e.g. substantially equal to 500 mm.

For the person skilled in the art, it will be clear that modifications and variations of the devices and methods according to the present invention are perceivable. The figures are schematic. The particular embodiments described above with reference to the accompanying drawings are illustrative only and not meant to limit the scope of the invention, which is defined by the appended claims.

The invention claimed is:

1. An imaging device, comprising:
   a modifier system to form axial light beams from received light beams, the axial light beams being parallel with an optical axis (AX1) of the imaging device,
   a Fabry-Perot interferometer to provide filtered axial light beams by filtering light of the axial light beams,
   an image sensor, and
   an array of lenses to form a plurality of sub-images on the image sensor by focusing light of the filtered light beams,
wherein the modifier system and the Fabry-Perot interferometer are arranged to form an axial filtered light beam from a received light beam such that the axial filtered light beam overlaps a first lens of the array and a second adjacent lens of the array, wherein the first lens focuses light of the axial filtered light beam to the image sensor so as to form a first image point of a first sub-image, wherein the second lens focuses light of the axial filtered light beam to the image sensor so as to form a second image point of a second sub-image, wherein the first image point and the second image point are spatially separate, wherein the first image point and the second image point are images of the same object point.

2. The device of claim 1, wherein the modifier system is a telecentric lens system.

3. The device of claim 1, wherein the modifier system is an afocal system which comprises combination of a lens and a limiter unit, wherein the focal length of the lens is negative, and wherein the limiter unit (NAL2) is arranged to prevent propagation of light rays which are outside a predetermined acceptance cone.

4. The device of claim 3, wherein the limiter unit comprises a fiber optic array.

5. The device according to claim 1, comprising an optical modulator and a filter array, wherein the filter array comprises a plurality of first filter regions, wherein transmittance of the modulator is modulable so as to alternately enable and disable transmission of light through the first filter regions of the filter array.

6. The device according to claim 1 comprising one or more data processors to receive image data of the sub-images captured by the image sensor, and to stitch image data of the captured sub-images.

7. A method, comprising:
   receiving light beams from object points of an object,
   forming axial light beams from the received light beams by using an optical modifier system, the axial light beams being parallel with an optical axis of the imaging device,
   providing filtered axial light beams from the axial light beams by using a Fabry-Perot interferometer as an optical filter,
   using an array of lenses to form a plurality of sub-images on an image sensor by focusing light of the filtered light beams,
wherein the optical modifier system and the Fabry-Perot interferometer are arranged to form an axial filtered light beam from a received light beam such that the axial filtered light beam overlaps a first lens of the array and a second adjacent lens of the array, wherein the first lens focuses light of the axial filtered light beam to the image sensor so as to form a first image point of a first sub-image, wherein the second lens focuses light of the axial filtered light beam to the image sensor so as to form a second image point of a second sub-image, wherein the first image point and the second image point are spatially separate, wherein the first image point and the second image point are images of the same object point.

8. The method of claim 7 comprising forming a spectral image of the object by stitching the sub-images together.

9. The method of claim 7, wherein the modifier system is a telecentric lens system.

10. The method of claim 7, wherein the modifier system comprises a negative lens and a limiter unit, wherein the limiter unit prevents propagation of light rays which are outside a predetermined acceptance cone.

11. The method according to claim 7, comprising:
    setting a transmittance peak of the Fabry-Perot interferometer to a first wavelength,
    capturing a plurality of first sub-images when the transmittance peak of the Fabry-Perot interferometer is at said first wavelength,
    setting a transmittance peak of the Fabry-Perot interferometer to a second wavelength,
    capturing a plurality of second sub-images (S when the transmittance peak of the Fabry-Perot interferometer is at said second wavelength,
    forming a first spectral image of the object by stitching the first sub-images,
    forming a second spectral image of the object by stitching the second sub-images, and
    forming a multi-spectral image of the object by combining the first spectral image with the second spectral image.

* * * * *